US 12,452,358 B2

United States Patent
Goh et al.

(10) Patent No.: US 12,452,358 B2
(45) Date of Patent: Oct. 21, 2025

(54) SYSTEM AND METHOD FOR SWITCHING SYSTEM AMONG PLURAL WIRELESSLY COUPLED INPUT/OUTPUT DEVICES USING A SINGLE WIRELESS AUDIO SWITCHING DONGLE

(71) Applicant: Dell Products, LP, Round Rock, TX (US)

(72) Inventors: Peng Lip Goh, Singapore (SG); Eng Kang Chng, Singapore (SG); Suet Chan Law, Singapore (SG)

(73) Assignee: DELL PRODUCTS LP, Round Rock, TX (US)

(*) Notice: Subject to any disclaimer, the term of this patent is extended or adjusted under 35 U.S.C. 154(b) by 632 days.

(21) Appl. No.: 17/733,214

(22) Filed: Apr. 29, 2022

(65) Prior Publication Data

US 2023/0353668 A1    Nov. 2, 2023

(51) Int. Cl.
| | |
|---|---|
| *H04M 1/60* | (2006.01) |
| *H04M 1/72412* | (2021.01) |
| *H04W 4/20* | (2018.01) |
| *H04W 4/80* | (2018.01) |
| *H04W 76/10* | (2018.01) |
| *H04W 80/10* | (2009.01) |

(52) U.S. Cl.
CPC ..... *H04M 1/72412* (2021.01); *H04M 1/6041* (2013.01); *H04W 76/10* (2018.02); *H04W 80/10* (2013.01)

(58) Field of Classification Search
CPC ..... H04W 4/30–48; H04W 4/70; H04W 4/80; H04W 76/00; H04W 76/10; H04W 76/14; H04W 76/15; H04W 76/20; H04W 76/23; H04W 84/12; H04M 1/72412; H04M 1/6041

See application file for complete search history.

(56) References Cited

U.S. PATENT DOCUMENTS

| | | | |
|---|---|---|---|
| 2017/0075654 A1* | 3/2017 | Shin | H04R 1/1041 |
| 2019/0220430 A1* | 7/2019 | Rand | G06F 13/122 |
| 2020/0367006 A1* | 11/2020 | Beckhardt | H04S 3/008 |
| 2020/0389714 A1* | 12/2020 | Roche | H04R 1/345 |
| 2022/0345979 A1* | 10/2022 | Tumuluru | H04W 40/20 |

* cited by examiner

*Primary Examiner* — San Htun
(74) *Attorney, Agent, or Firm* — Prol Intellectual Property Law, PLLC; H. Kenneth Prol

(57) ABSTRACT

An information handling system having an audio switching dongle operatively coupled to first wireless speaker and microphone device, the audio switching dongle further including an audio switching dongle wireless radio system operatively coupled via a first Wi-Fi protocol wireless link to transmit and receive the audio data on an active audio data stream with the first wireless speaker and microphone device and a second, parallel Wi-Fi protocol wireless link with the second wireless speaker and microphone device in standby, the audio switching dongle wireless radio system to receive a switching command from the second wireless speaker and microphone device pursuant to a user switch input from a user, and a controller integrated circuit to activate the second, parallel Wi-Fi protocol wireless link to transmit and receive the audio data of the active audio data stream and to transition the first Wi-Fi protocol wireless link to standby.

20 Claims, 7 Drawing Sheets

SYSTEM AND METHOD FOR SWITCHING SYSTEM AMONG PLURAL WIRELESSLY COUPLED INPUT/OUTPUT DEVICES USING A SINGLE WIRELESS AUDIO SWITCHING DONGLE

FIELD OF THE DISCLOSURE

The present disclosure generally relates to wireless speaker and microphone devices, such as earbuds and headphones. More specifically, the present disclosure relates to an audio switching dongle coupled to an information handling system or integrated into the same, operating independently from the information handling system operating system (OS) for orchestrating switching of an active audio stream between a plurality of wirelessly coupled wireless speaker and microphone devices.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, wearable peripheral device, touchpad, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
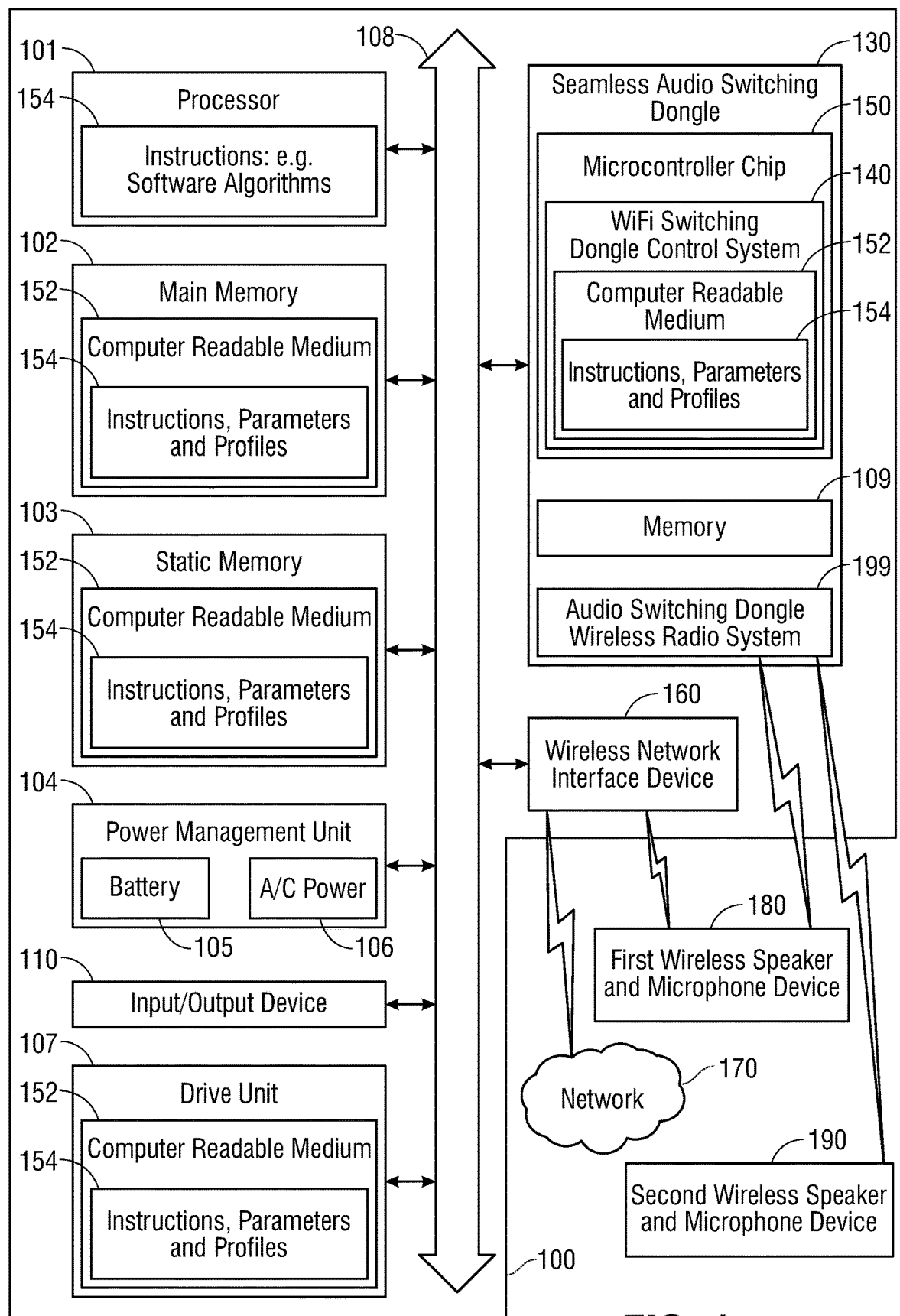
FIG. 1 is a block diagram illustrating an information handling system operatively coupled to an audio switching dongle orchestrating wireless communication with plural wireless speaker and microphone devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ a plurality of wireless speaker and microphone devices (e.g., earbuds, headphones, smart speakers, laptops, tablets) located remotely from the information handling system to transmit and receive streaming audio data such as streaming music, streaming podcasts, phone calls, or online meetings (e.g., through Zoom®, or Microsoft® Teams®). An active audio data stream may begin with the information handling system or a first wireless speaker and microphone device (e.g., earbuds) acting as the primary point of input (e.g., via a microphone) and output (e.g., via a speaker) for the user. The user may wish to shift the active audio data stream to another wireless speaker and microphone device (e.g., smart speaker such as Alexa® Echo® or Google® Mini-Home®) as the primary point of input/output within the same active audio data stream.

Existing systems may require the user to perform one or more steps via a graphical user interface (GUI) at the information handling system in order to handoff the active audio data stream between wireless speaker and microphone devices in such a way. This may be required due to the fact that the information handling system may establish a separate wireless link for each of the wireless speaker and microphone devices, and hands off active audio streams by moving transmission of that stream from one wireless link to another. Thus, in order to switch between wireless speaker and microphone devices, the user may need to select, via a GUI, which wireless speaker and microphone device (and its corresponding wireless link) to handoff the active audio data stream. In some cases, the user may also have to provide some form of input via one or more of these wireless speaker and microphone devices in order to perform such a handoff, such as initiating a wireless coupling sequence at the wireless speaker and microphone device. Performing these steps via the GUI of the information handling system or the wireless speaker and microphone devices in such a way may distract the user from the active audio stream (e.g., call, meeting, or session), and could result in failed wireless couplings, dropped calls, or a pause or gap in the active audio data stream during switchover negatively impacting user experience. A solution is needed to allow users to handoff active audio data streams between multiple wireless speaker and microphone devices with minimal user input.

The Wi-Fi switching dongle control system in embodiments of the present disclosure, operating at an audio switching dongle operatively connected to an information handling system address these issues by providing an automatic method for handing off active audio data streams such as calls, meetings, or sessions from one wireless speaker and microphone device to a second wireless speaker and microphone device without the need for user input or use of the operating system (OS) at the information handling system through which the active audio data stream was initiated. In embodiments of the present disclosure, the Wi-Fi switching dongle control system of the audio switching dongle may wirelessly couple with multiple wireless speaker and microphone devices within communication range of the information handling system, such as earbuds, headphones, smart speakers, other information handling systems (e.g., smart phones, laptops, tablets). Upon such an initial, pre-set wireless coupling session, the Wi-Fi switching dongle control system operating at the audio switching dongle may establish wireless links with each of the wireless speaker and microphone devices, and transmit an instruction to each of the wireless speaker and microphone devices to initiate a standby or low-power mode. Each of the wirelessly coupled wireless speaker and microphone devices in embodiments may remain in such a standby mode, in which their respective radio systems may process only minimal data packets (e.g., control instructions from the audio switching dongle, push notifications, e-mails), until the audio switching dongle selects one of the wireless speaker and microphone devices for transmission and receipt of an active audio data stream (e.g., streaming music, podcasts, Wi-Fi or cellular calls, online meetings, etc.).

Following such preset wireless couplings between the first wireless speaker and microphone device and the information handling system, between the audio switching dongle and each of the plurality of wireless speaker and microphone devices, a later active audio data stream may be initiated at the information handling system. For example, a call, online meeting, streaming audio or other audio data stream may be initiated. In embodiments described herein, the audio switching dongle operatively coupled to the information handling system may select a first wireless speaker and microphone device, which may be set to standby mode, to transmit and receive data within the active audio stream via a first, pre-established wireless link, such as utilizing a Wi-Fi protocol or proprietary Wi-Fi protocol. The audio switching dongle in embodiments may then transmit an instruction to the first wireless speaker and microphone system to disengage the standby mode and allow the radio system at the first wireless speaker and microphone system to begin transceiving the active audio data stream without restrictions (e.g., restrictions on packet type or power consumption at the radio system related to the standby mode). Each of the remaining wireless speaker and microphone devices in embodiments may remain in communication with the audio switching dongle on parallel wireless links with the audio switching dongle, and also remain in standby mode such that the radio systems of each of these remaining devices does not transceive audio data on the active audio stream.

A user may indicate a desire to switch the active audio stream from the first wireless speaker and microphone device to a second wireless speaker and microphone device in embodiments, by providing user input via a user interface (e.g., button, switch, capacitive or resistive touch switch, or voice input) at the second wireless speaker and microphone device. In embodiments described herein, the second wireless speaker and microphone device may transmit a switching command instruction to the audio switching dongle to switch the audio data stream to the second wireless speaker and microphone device via the second, parallel wireless link, previously established between the second wireless speaker and microphone device and the audio switching dongle. For example, this may be a second, parallel Wi-Fi link. The Wi-Fi switching dongle control system operating at the audio switching dongle may consequently transmit a first stand-by command or instruction to the first wireless speaker and microphone device to cease transmission and reception of the active audio data stream by placing its radio system in standby mode, and transmit a second activation command or instruction to the second wireless speaker and microphone device to disengage standby mode and to begin transmission and reception of the active audio data stream. These instructions to enter or disengage standby mode in embodiments described herein may be generated, processed, and transmitted via firmware instructions processed by microcontrollers of the audio switching dongle and processed at the multiple wireless speaker and microphone devices, respectively, in various embodiments described herein. As such, selection of and switching between the multiple wireless speaker and microphone devices for receipt and transmission of the active audio data stream, as described herein, may be performed independently from processing of OS instructions at a processor of the information handling system. In such a way, the Wi-Fi switching dongle control system operating at an audio switching dongle operatively coupled to the information handling system and at a plurality of wireless speaker and microphone devices in embodiments of the present disclosure may allow a user to seamlessly switch between these wireless speaker and microphone devices as the primary source of input/output during an active audio data stream, without interacting with the OS or a GUI of the information handling system.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for an information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 in an embodiment is operably coupled to an audio switching dongle 130, which may orchestrate seamless handoff of active audio data streams between or among a plurality of wireless speaker and microphone devices (e.g., 180 and 190) in an embodiment. The audio switching dongle 130 in an embodiment may house a microcontroller 150 executing firmware instructions of the Wi-Fi switching dongle control system 140 in an embodiment. The audio switching dongle 130 may be operatively coupled to the information handling system 100 through insertion of the audio switching dongle 130 within a USB port or other data port of the information handling system 100 in an embodiment. In another embodiment, the audio switching dongle 130 may be incorporated within the housing of the information handling system 100, such as integrated a part of a wireless network interface device 160, and operatively coupled to the bus 108 of the information handling system 100 through one of several means for transmitting data, including connection through a USB hub, a Thunderbolt hub, or any other type of data transfer hub known in the art.

The audio switching dongle 130 in an embodiment may be coupled to one or more wireless speaker and microphone devices 180 and 190 capable of wirelessly receiving and transmitting audio data, such as a voice call or streaming audio content (e.g., podcast, music, etc.) via Wi-Fi protocol wireless links with the wireless speaker and microphone devices 180 and 190 and the audio switching dongle wireless radio system 199. In some embodiments, the wireless speaker and microphone devices 180 or 190 may comprise a wearable hearing device that a user may position in or around the user's ears, such as earbuds or headphones. In other embodiments, the wireless speaker and microphone devices 180 or 190 may comprise a smart speaker system (e.g., Alex® Echo® or Dot®, or Google® Mini-Home® devices), or a tablet, desktop, or laptop computing device. Information handling system 100 may be any information handling system, such as a smart phone, tablet, or laptop, used with a wireless speaker and microphone device 180 or 190.

The audio switching dongle wireless radio system 199 in an embodiment may be capable of communication between the information handling system and the wirelessly coupled wireless speaker and microphone device 180 using a wireless link established using Wi-Fi, Near Field Communication (NFC), or Bluetooth® technology such as Bluetooth® or Bluetooth Low Energy protocols, for example. The audio switching dongle wireless radio system 199 in an embodiment may transmit and receive information necessary to wirelessly couple the wireless speaker and microphone device 180 with the information handling system 100, such as, for example, wireless communication profiles for the information handling system 100 and particular to the wireless speaker and microphone device 180. Such wireless communication profiles may operate to identify the wireless speaker and microphone device 180 as a device authorized to transceive data with the information handling system 100, as well as information sufficient to identify the wireless speaker and microphone device 180, such as a Media Access Control (MAC) address, IP address. The wireless communication profiles in an embodiment may further store various types of information necessary to perform a handshake between at least one wireless speaker and microphone device 180 and the information handling system 100, such as various public keys, private keys, hashing algorithms, short-term keys, long-term keys, or encryption/decryption algorithms.

The audio switching dongle wireless radio system 199 may provide connectivity of the audio switching dongle 130 operatively coupled to the information handling system 100 to one or more operatively coupled wireless input/output devices such as wireless speaker and microphone devices 180 or 190, such as earbuds, headphones, smart speakers, tablets, laptops or desktop computing devices, as described in greater detail herein. For example, the audio switching dongle wireless radio system 199 may establish a first wireless link directly to the first wireless speaker and microphone device 180, another, parallel wireless link directly to the second wireless speaker and microphone device 190, or any number of additional parallel wireless links to additional wireless speaker and microphone devices in an embodiment. Further, wireless links may be established among the wireless speaker and microphone devices 180 and 190. Such wireless links may be established pursuant to Wi-Fi, Bluetooth®, Bluetooth Low Energy® (BLE) protocols, or NFC for example. In some embodiments, the Bluetooth® protocols or BLE protocols (e.g., protocols established under the Institute of Electrical and Electronics Engineers protocol 802.15.1) may be used to establish a Private Area Network (PAN) (e.g., 170) in which the information handling system 100 may communicate wirelessly with any wireless speaker and microphone devices (e.g., 180 and 190) paired to the PAN 170 using a Bluetooth® compliant wireless communication profile. The PAN 170 in such an embodiment may communicate data between the information handling system 100 and any wirelessly coupled wireless speaker and microphone devices (e.g., 180 and 190) over short distances using Ultra High Frequency (UHF) radio waves in the Industrial, Scientific, and Medical purposes bands (ISM bands) between 2.402 and 2.48 GHz. Reference to Bluetooth® may refer to either or both of the Bluetooth® or Bluetooth Low Energy (BLE) and any revision of those protocols.

In some aspects of the present disclosure, the audio switching dongle wireless radio system 199 may operate two or more wireless links. In other aspects of the present disclosure, the audio switching dongle 130 may include a plurality of audio switching dongle wireless radio systems, each capable of establishing a separate wireless link to one of the plurality of wireless speaker and microphone devices (e.g., 180), such that the audio switching dongle 130 may be in communication with a plurality of wireless speaker and microphone devices (e.g., 180 and 190) via a plurality of wireless links.

The audio switching dongle wireless radio system 199 may operate in accordance with any Wi-Fi data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments. In an embodiment, the audio switching dongle wireless radio system 199 may operate in accordance with a modified Wi-Fi data communication standard, such as a proprietary version of the Wi-Fi standard or a future version, where, for example, additional metadata and command data exchange capacity are provisioned between the wireless speaker and microphone device radio systems and an audio switching dongle wireless radio system for control and management of plural wirelessly coupled devices to the audio switching dongle.

The present disclosure contemplates a computer-readable medium that includes instructions, parameters, and profiles 154 or receives and executes instructions, parameters, and profiles 154 responsive to a propagated signal, so that a device connected to the audio switching dongle wireless radio system 199 may communicate voice, video or data to the audio switching dongle 130. Further, the instructions 154 may be transmitted or received via various wireless links established between the audio switching dongle wireless radio system 199 and a plurality of wireless speaker and microphone devices (e.g., 180 and 190). The audio switching dongle 130 may include a set of instructions 154 may include firmware or software that may be executed to cause the audio switching dongle 130 to perform any one or more of the methods or computer-based functions disclosed herein via a microcontroller chip 150 for a controller integrated circuit. For example, instructions 154 may include a particular example of a Wi-Fi switching dongle control system 140, or other aspects or components. Application instructions 154 may also include any application processing drivers, or the like executing on information handling system 100 or audio switching dongle 130. Instructions 154 may further be executed as any software applications, operating systems, application programming interfaces, drivers or the like on the information handling system 100.

The Wi-Fi switching dongle control system 140 may utilize a computer-readable medium 152 in which one or more sets of instructions 154 may operate in part as firmware instructions executed on the audio switching dongle 130. The instructions 154 may embody one or more of the methods or logic as described herein. For example, instructions relating to the Wi-Fi switching dongle control system 140, firmware algorithms, processes, and/or methods may be stored here. More specifically, instructions 154 may be executed by the processor 101 or other processing resources such as an embedded controller (EC) or microcontroller integrated circuit 150 to wirelessly couple the wireless speaker and microphone device 180 with the audio switching dongle 130. Such instructions 154 when executed may cause transmitting wireless communication profiles for the information handling system 100 and receiving wireless communication profiles for the wireless speaker and microphone device 180 at the audio switching dongle 130. The instructions 154 may further operate to perform various types of handshakes or encryption/decryption using various public keys, private keys, hashing algorithms, short-term keys, long-term keys, or encryption/decryption algorithms stored in the shared wireless coupling or wireless communication profiles. Via the audio switching dongle wireless radio system 199, in an embodiment, the microcontroller integrated circuit 150 may execute code instructions 154 of the Wi-Fi switching dongle control system 140, such as via firmware, to establish a wireless link for transceiving audio data from the information handling system processor or data bus on an active audio data stream with one of a plurality of wireless speaker and microphone devices (e.g., 180 or 190) at any given time.

Memory 109 located and controlled by the audio switching dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof. The instructions, parameters, and profiles 154 of the Wi-Fi switching dongle control system 140 may be stored in memory 109 on a computer-readable medium 152 such as a flash memory or magnetic disk in an example embodiment. Portions of the Wi-Fi switching dongle control system 140 may operate at the audio switching dongle 130 or at either wireless speaker and microphone devices 180, 190 or some combination in various embodiments herein. In an example embodiment, computer readable medium 152 in an embodiment may store wireless communication profiles for identifying the wireless speaker and microphone device 180 as a device authorized to transceive data with the information handling system 100, as well as information sufficient to identify the wireless speaker and microphone device 180, such as a Media Access Control (MAC) address, IP address. The wireless communication profiles in an embodiment may further store various types of information necessary to perform a handshake between the wireless speaker and microphone device 180 and the information handling system 100, such as various public keys, private keys, hashing algorithms, short-term keys, long-term keys, or encryption/decryption algorithms. The wireless communication profiles wireless speaker and microphone devices 180, 190 enable parallel wireless links to be maintained and transitioned between active or stand-by modes while also providing for exchange of command communications with the audio switching dongle 130.

After an initial pre-set wireless coupling process between the audio switching dongle 130 and a plurality of wireless speaker and microphone devices (e.g., 180 and 190), the microcontroller 150 may execute code instructions 154 of the Wi-Fi switching dongle control system 140 to place wirelessly coupled wireless speaker and microphone devices in standby mode. For example, the microcontroller 150 may instruct the audio switching dongle wireless radio system 199 in an embodiment to transmit a standby command to each of the wireless speaker and microphone devices (e.g., 180 and 190). Each of the wirelessly coupled wireless speaker and microphone devices (e.g., 180 and 190) in such an embodiment may remain in such a standby mode, in which their respective radio systems may process only minimal data packets (e.g., control instructions from the audio switching dongle 130, push notifications, e-mails), until the audio switching dongle 130 selects one of the wireless speaker and microphone devices for transmission and receipt of audio data on an active audio data stream (e.g., streaming music, podcasts, Wi-Fi or cellular calls, online meetings, etc.) established by the information handling system 100.

The network interface device 160 in an embodiment may establish a wireless link with the network 170 to conduct an active audio data stream from a remote source such as an ongoing call, virtual meeting, or audio streaming from an online audio streaming service. The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, various components of the audio switching dongle 130 (e.g., microcontroller chip 150, memory 109, or audio switching dongle wireless radio system 199), a static memory 103 or drive unit 107 or other components of an information handling system.

As described herein, the network interface device 160 in an embodiment may establish a wireless link with the network 170 to conduct an active audio data stream from a remote source such as an ongoing call, virtual meeting, or audio streaming from an online audio streaming service. The information handling system 100 in such an embodiment may operate on wired and wireless links to connect with the network 170 via a network Access Point (AP) or base station. The wireless network interface device 160 in an embodiment may be capable of communication between the information handling system and network 170 (e.g., LAN, WLAN, WAN, WLAN) in some embodiments. Further, the information handling system 100 may also include one or more buses (e.g., 108) operable to transmit communications between the various hardware components. Portions of an information handling system 100 may themselves be considered information handling systems 100 in the embodiments presented herein. The information handling system 100 in an embodiment may transmit and receive data pursuant to the active audio data stream described directly above with the audio switching dongle 130 via such a bus 108 and in some embodiments a data port, for example.

Information handling system 100 may include devices or modules that embody one or more of the devices or execute instructions for the one or more systems and modules described herein, and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, or static memory 103, containing operating system (OS) software, application software, BIOS software, or other software applications or drivers detectable by processor type 101. The disk drive unit 107 and static memory 103 may also contain space for data storage. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi_33 communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4

GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments.

Upon the information handling system 100 in an embodiment transmitting and receiving data with the audio switching dongle 130 pursuant to an active audio data stream, as described herein, the audio switching dongle 130 and microcontroller 150 may execute code instructions of the Wi-Fi switching dongle control system 140 to transmit a wake or activate command, via the audio switching dongle wireless radio system 199 to one of the wirelessly coupled wireless speaker and microphone devices (e.g., 180). The audio switching dongle 130 may then begin transceiving audio data on the active audio data stream with the first wireless speaker and microphone device 180. The audio switching dongle wireless radio system 199 in such an embodiment may simultaneously maintain a parallel wireless link with the second wireless speaker and microphone device 190, which may remain in standby mode. While operating in standby mode, the second wireless speaker and microphone device in an embodiment may still be capable of receiving user input to switch the audio data stream to the second wireless speaker and microphone device at that same second wireless speaker and microphone device, and consequently transmit a switching command to the audio switching dongle 130. The microcontroller chip 150 may execute code instructions 154 of the Wi-Fi switching dongle control system 140 to handoff an active audio data stream from a first wireless speaker and microphone device 180 to the second wireless speaker and microphone device 190 only upon determining that the second wireless speaker and microphone device 190 is within communication range of the audio switching dongle 130. This may be determined passively, because the microcontroller 150 may only execute the instructions 154 in such a way following receipt of a switching command from the second wireless speaker and microphone device 190 which may only occur in range. If the second wireless speaker and microphone device 190 is not within communication range of the audio switching dongle 130, the audio switching dongle 130 may not receive the command.

Upon receipt of such a command, the microcontroller 150 may execute instructions 154 to transmit a standby command to the first wireless speaker and microphone device 180, causing the wireless link with the first wireless speaker and microphone device 180 to cease transmitting and receiving data pursuant to the active audio data stream on its wireless link, for example a Wi-Fi link. The microcontroller 150 may also execute instructions 154 to transmit a wake or activate command to the second wireless speaker and microphone device 190, causing the second wireless speaker and microphone device 190 to lift any standby mode restrictions on data being transceived via the second, parallel wireless link between the audio switching dongle 130 and the second wireless speaker and microphone device 190. In such an embodiment, the second, parallel wireless link between the second wireless speaker and microphone device 190 and the audio switching dongle 130 may then begin transceiving audio data one the active audio data stream established by the information handling system 100. As such, the audio data stream can be handed off between multiple wireless speaker and microphone devices (e.g., 180 and 190) seamlessly by switching which device actively transceivers the audio data stream among the wireless speaker and microphone devices, and without intervention by the user at the information handling system 100 (e.g., via a GUI, or other aspect of the information handling system OS).

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
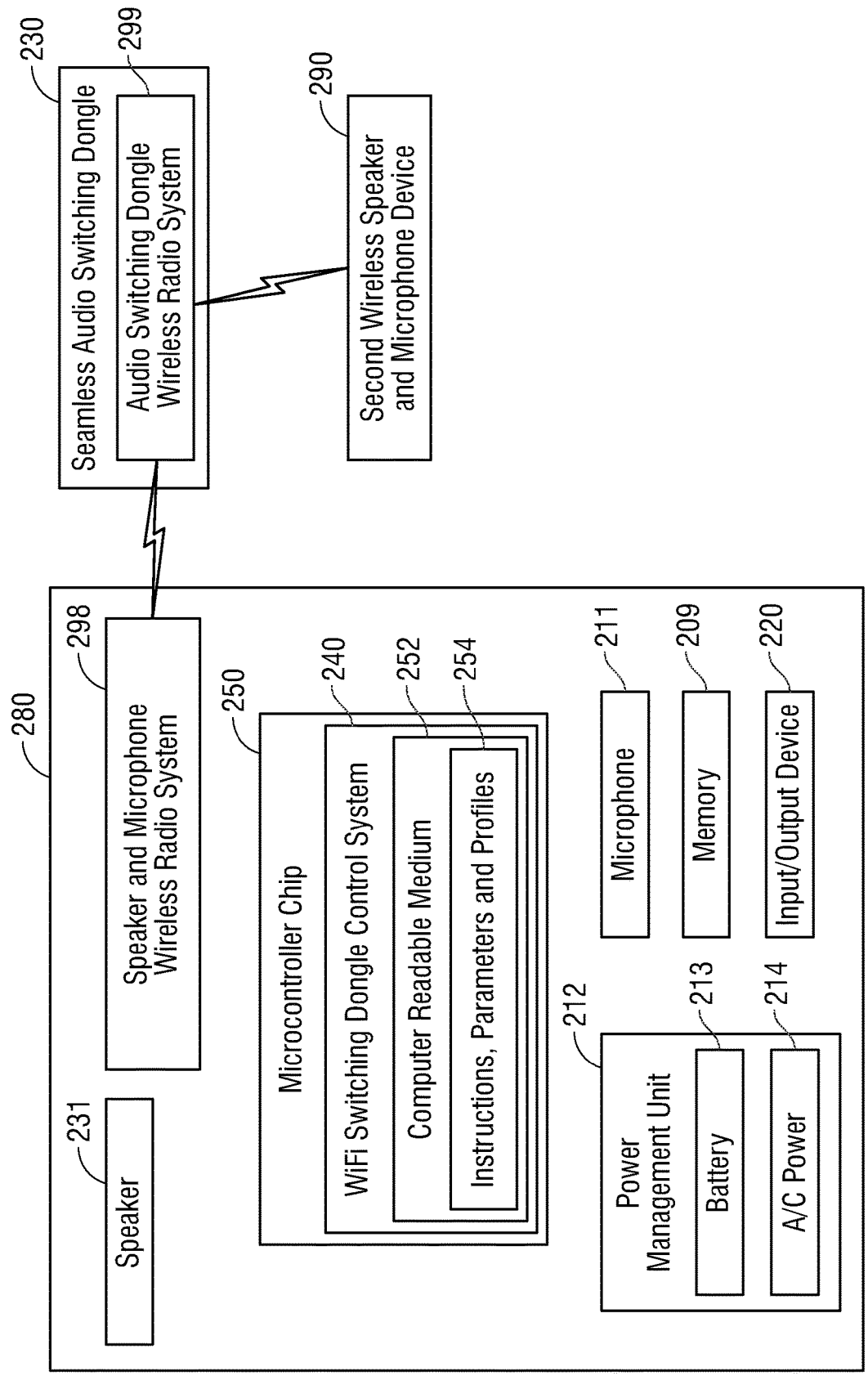
FIG. 2 is a graphical diagram illustrating a wireless speaker and microphone device wirelessly connected to an audio switching dongle operatively coupled to an information handling system according to an embodiment of the present disclosure.

FIG. 2 is a graphical diagram illustrating a wireless speaker and microphone device 230 operably coupled to audio switching dongle 230 according to an embodiment of the present disclosure. The audio switching dongle 230 in an embodiment is operably coupled to a wireless speaker and microphone device 280 capable of wirelessly receiving and transmitting audio data, such as a voice call or streaming audio content (e.g., podcast, music, etc.) via a link with the speaker and microphone wireless radio system 298. In some embodiments, the wireless speaker and microphone device 280 may comprise a wearable hearing device that a user may position in or around the user's ears, such as earbuds or headphones. In other embodiments, the wireless speaker and microphone device 280 may comprise a smart speaker system (e.g., Alex® Echo® or Dot®, or Google® Mini-Home® devices), or a tablet, desktop, or laptop computing device. Such a wireless speaker and microphone device 280 in an embodiment may house a microphone 211 for recording a user's voice and a speaker 231 for outputting or playing audio data received from the audio switching dongle 230 via the speaker and microphone wireless radio system 298. A power management unit 212 with a battery 213 or A/C power charging adapter 214 may be on the wireless speaker and microphone device 280 to provide power to the microcontroller chip 250, the speaker 231, the microphone 211, or other components of the wireless speaker and microphone device 280. An input/output device 220, such as a push button, a voice assistant, digital display, capacitive or resistive touch switch, or physical switch, for example, may allow the user to indicate a desire to hand an active audio data stream to the first wireless speaker and microphone device 280, or provide visible (e.g., light flashing a certain color) or audible feedback (e.g., alarm, buzzer, or voice indicator) to a user that an attempt to handoff the active audio data stream has failed. In some embodiments, the active audio data stream may also be handed off from the first wireless speaker and microphone device 290 to a second wireless speaker and microphone device 290, which may be the same type of device as the first wireless speaker and microphone device 280. For example, both the first and second wireless speaker and microphone devices (e.g., 280 and 290) may comprise separate, individual sets of earbuds). In other embodiments, the second wireless speaker and microphone device 290 (e.g., smart speaker) may comprise another type of wireless speaker and microphone device than the first wireless speaker and microphone device 280 (e.g., earbuds).

In an embodiment, the wireless speaker and microphone device 280 may include a microcontroller chip 250 that may be any device or devices that execute instructions, parameters, and profiles 254 of a Wi-Fi switching dongle control system 240 counterpart portion on the wireless speaker and microphone device 280 to facilitate automatic switching between a plurality of wireless speaker and microphone devices during an active audio data stream initiated at the audio switching dongle 230. More specifically, instructions 254 may be executed by the microcontroller chip 250, for example a controller integrated circuit, to wirelessly couple the wireless speaker and microphone device 280 with the audio switching dongle 230 with a first wireless link, such as via a Wi-Fi protocol in an embodiment. Such instructions 254 may comprise transmitting a wireless communication profile for the wireless speaker and microphone device 280 to audio switching dongle 230 and receiving wireless communication profiles for the audio switching dongle 230 at the wireless speaker and microphone device 280. The instructions 254 may further operate to perform various types of handshakes or encryption/decryption using various public keys, private keys, hashing algorithms, short-term keys, long-term keys, or encryption/decryption algorithms stored in the shared wireless coupling or wireless communication profiles. Any or all of the above may be included in a wireless communication profiles relating to the first wireless coupling between the first wireless speaker and microphone device 280 and the audio switching dongle 230 in a first wireless link in various embodiments. Such wireless communication profiles may be stored in a memory 209 at the first wireless speaker and microphone device 280 or at the audio switching dongle as described herein.

Via speaker and microphone wireless radio system 298, in an embodiment, the microcontroller chip 250 may execute code instructions 254 of the Wi-Fi switching dongle control system 240 to receive a standby command from the audio switching dongle 230 immediately upon initialization of a wireless link to wirelessly couple the wireless speaker and microphone device 280. The microcontroller chip 250 in an embodiment may execute such a standby command in an embodiment by limiting the power supplied by the PMU 212 to the speaker and microphone wireless radio system 298, or to limit the types of data packets transceived via the speaker and microphone wireless radio system 298 such as limiting audio data. For example, the microcontroller ship 250 may restrict the speaker and microphone wireless radio system 298 in an embodiment to transceiving of data packets related to command instructions transmitted to or received from the audio switching dongle wireless radio system 299, among other low-bitrate transmissions such as push-notifications or data command packets. In such a way, the microcontroller chip 250 may place the speaker and microphone wireless radio system 298 in a standby mode where it awaits further instructions from the audio switching dongle 230, without actively transceiving any audio data stream with the audio switching dongle 230. The first wireless speaker and microphone device 280 in such an embodiment may remain in this standby mode until it receives a wake or activate command from the audio switching dongle 230.

As described herein, the information handling system operatively coupled to the audio switching dongle 230 in an embodiment may transceive audio data with the audio switching dongle 230 pursuant to an active audio data stream. In such an embodiment, the audio switching dongle 230 may select either the first or the second wireless speaker and microphone device (e.g., 280 or 290) to transmit and receive data pursuant to that active audio data stream. For example, in one embodiment, the audio switching dongle 230 may select the first wireless speaker and microphone device 280 to transmit and receive audio data pursuant to the active audio data stream by default, or by reference to a priority assigned to each of the currently wirelessly coupled wireless speaker and microphone devices (e.g., 280 and 290).

In such an embodiment, the audio switching dongle wireless radio system 299 may transmit a wake or activate command to the speaker and microphone wireless radio system 298. The microcontroller 250 in such an embodiment may execute code instructions of the Wi-Fi switching dongle control system 240 to lift the standby or low-power mode restrictions placed on the speaker and microphone wireless radio system 298 pursuant to the previously received standby command. The speaker and microphone wireless radio system 298 may begin to draw full power from the PMU 212 and may lift restrictions on the types of data packets transceived in such an embodiment. This may allow the audio switching dongle 230 and the first wireless speaker and microphone system 280 to transceive audio data pursuant to the active audio data stream via the wireless link between them. Consequently, the first wireless speaker and microphone system 280 may begin receiving audio input, via the microphone 211, for that active audio data stream and outputting audio output for that active audio data stream via the speaker 231.

In another aspect of an embodiment, the audio switching dongle 230 may later instruct the first wireless speaker and microphone device 280, via a stand-by command, to cease transceiving data pursuant to the active audio data stream by placing the first wireless speaker and microphone 280 back into a standby mode. For example, the audio switching dongle wireless radio system may transmit a second standby command to the speaker and microphone wireless radio system, and instructions 254 may be executed by the microcontroller chip 250 to once again lower the power supplied by the PMU 212 to the speaker and microphone wireless radio system 298 or to limit the types of data packets the speaker and microphone wireless radio system 298 transceivers to exclude audio data on the active audio data stream.

In another embodiment, the audio switching dongle may also select the second wireless speaker and microphone device 290 to transceive audio data on the active audio data stream, rather than the first wireless speaker and microphone device 280. In such an embodiment, the user may have indicated, through interaction with an input/output device 220 or the speaker 231 on the second wireless speaker and microphone device 290.

To switch back, the user may indicate, through interaction with an input/output device 220 or the speaker 231 on the first wireless speaker and microphone device 280, the intent to switch the active audio data stream from the second wireless speaker and microphone device 290 to the first wireless speaker and microphone device 280. For example, the user may provide such an indication via a push button, a voice assistant, digital display, capacitive or resistive touch switch, or physical switch. When a switching command or instruction is received at the first wireless speaker and microphone device 280 from a touch button or other user input device 220, then the Wi-Fi switching dongle control system 240 may transmit a switching command to the audio switching dongle wireless radio system 299 of the audio switching dongle 230, via the speaker and microphone wireless radio system 298. As described herein, although the speaker and microphone wireless radio system 298 may be operating in a standby mode at such time, the standby mode may allow for transmission of command instructions to and from the audio switching dongle 230 in an embodiment.

Upon receipt of this switching command at the audio switching dongle 230 from the user and the first wireless speaker and microphone device 280, the audio switching dongle 230 may transmit a wake or activate command to the first wireless speaker and microphone device 280 to transition the speaker and microphone wireless radio system 298 of the first wireless speaker and microphone device 280 out of standby mode. The audio switching dongle 230 upon receipt of the switching command may also send a stand-by command or instruction to the second wireless speaker and microphone device 290 to transition to stand-by mode as described herein. In some embodiments, the microcontroller 250 may only execute such instructions 254 upon determining that the first wireless speaker and microphone device 280 is still within communication range of the audio switching dongle 230. This may be determined passively, because the microcontroller 250 may only execute the instructions 254 in such a way following receipt of an acknowledgement that the switching command from the first wireless speaker and microphone device 280 was received and a wake or activate command was executed at the first wireless speaker and microphone device 280 while a stand-by command is executed at the second wireless speaker and microphone device 290. If the first wireless speaker and microphone device 280 is not still within communication range of the audio switching dongle 230 at the time of transmission, the audio switching dongle 230, as well as the second wireless speaker and microphone device 290, may not receive the switching or stand-by commands respectively and provide the acknowledgement or acknowledgements. If the first wireless speaker and microphone device 290 is not within communication range of the audio switching dongle 230 at the time of transmission in the above example embodiment of switching from the second wireless speaker and microphone device 290, the first wireless speaker and microphone device 280 may not be able to wake from the standby mode thus inhibiting receipt and transmission of audio data pursuant to the active audio data stream.

The audio switching dongle 230 in such an embodiment may conduct seamless switching by transmitting a standby command to the second wireless speaker and microphone device 290 to place the second wireless speaker and microphone device 290 in standby mode where transmission and reception of the active audio data stream may be prohibited and a wake or activate command to the wireless speaker and microphone device 280 to enable transmission and reception of audio data via the active audio data stream. The active audio data stream in such an embodiment may thus be handed off seamlessly from the second wireless speaker and microphone device 290 to the first wireless speaker and microphone device 280 pursuant to user input received at the input/output device 220 or the speaker 231. Because these switching procedures are executed in firmware (e.g., 154) by microcontrollers (e.g., 250) of the audio switching dongle and the first wireless speaker and microphone device 280 in an embodiment, the procedures may be completed without accessing or using the operating system of the information handling system. This may avoid dropped wireless coupling or interruption from transition to establish a switched-to wireless coupling.

The speaker and microphone wireless radio system 298 in an embodiment may be capable of communication between the wireless speaker and microphone device 280, and the audio switching dongle 230. Further the audio switching dongle 230 may be capable of communication with remote audio data streaming sources such as a call, virtual meeting, audio streaming service or the like via the information handling system which may be connected to a network (e.g., LAN, WLAN, WAN, WLAN) in some embodiments. Further, speaker and microphone wireless radio system 298 may be capable of communication with the wirelessly coupled audio switching dongle 230 using a wireless link established using any known or later developed Wi-Fi standards, a modified, proprietary Wi-Fi standard with additional command and control functionality, a Near Field Communication (NFC), or Bluetooth® technology, for example. The speaker and microphone wireless radio system 298 in an embodiment may transmit and receive information necessary to wirelessly couple (or pair) the wireless speaker and microphone device 280 with the audio switching dongle, such as, for example, wireless communication profiles for the audio switching dongle 230 under the Wi-Fi or proprietary Wi-Fi protocols. Such wireless coupling or wireless communication profiles may operate to identify the first wireless speaker and microphone device 280 as a device authorized to transceive data with the audio switching dongle 230, as well as information sufficient to identify the first wireless speaker and microphone device 280, such as a Media Access Control (MAC) address, IP address. The wireless coupling or wireless communication profiles in an embodiment may further store various types of information necessary to perform a handshake between the audio switching dongle 230 and the wireless speaker and microphone device 280, such as various public keys, private keys, hashing algorithms, short-term keys, long-term keys, or encryption/decryption algorithms. The wireless communication profiles for each wireless speaker and microphone device 280, 290 may enable the audio switching dongle 230 to maintain parallel wireless links and enable stand-by or activation control of those parallel wireless links.

The wireless speaker and microphone device 280 may, in some embodiments include a processor such as a central processing unit (CPU), a GPU, a Visual Processing Unit (VPU), or a hardware accelerator, microcontroller integrated circuits (e.g., 250) or hardware control logic or some combination of the same, such as when the wireless speaker and microphone device 280 is a laptop information handling system, earbuds, headphones, smart speaker or other device and those devices may have varying levels of processing resources. Any of the processing resources may operate to execute code that is either firmware or software code. Moreover, the wireless speaker and microphone device 280 may include memory such as memory 209, containing computer readable medium 252 storing instructions 254. Instructions 254 may include a Wi-Fi switching dongle control system 240, operating system (OS) software, application software, BIOS software, or other software applications or drivers detectable by processors or microcontroller 250. The instructions 254 in an embodiment may reside completely, or at least partially, within the memory 209.

Audio switching dongle 230 in an embodiment may be in communication via the speaker and microphone wireless radio system 298 with the wireless speaker and microphone device 280 such as a wearable earbud hearing device or a wearable headset hearing device, as described in greater detail herein. The audio switching dongle 230 in such an embodiment may be coupled to an information handling system which may operate on wired and wireless links to connect with a network via a network Access Point (AP) or base station, as described in greater detail herein.

The wireless speaker and microphone device 280 may include a set of instructions 254 that may be executed to cause the computer system such as audio switching dongle 230 or another wireless speaker and microphone device 290 to perform any one or more of the methods or computer-based functions disclosed herein. For example, instructions 254 may include a particular example of a Wi-Fi switching dongle control system 240, or other aspects or components. Various software modules comprising application instructions 254 may be coordinated via an application programming interface (API). Application instructions 254 may also include any application processing drivers, or the like executing on wireless speaker and microphone device 280 or 290.

The Wi-Fi switching dongle control system 240 on the wireless speaker and microphone device 280 may utilize a computer-readable medium 252 in which one or more sets of instructions 254 such as firmware may be embedded with microcontroller chip 250, for example a controller integrated circuit. In other embodiments, the Wi-Fi switching dongle control system 240 may operate in part as software or firmware instructions executed on the wireless speaker and microphone device 280. The instructions 254 may embody one or more of the methods or logic as described herein. For example, instructions relating to the Wi-Fi switching dongle control system 240, firmware or software algorithms, processes, and/or methods may be stored here.

Memory 209 may contain computer-readable medium (not shown), such as RAM in an example embodiment. An example of memory 209 includes random access memory (RAM) such as static RAM (SRAM), dynamic RAM (DRAM), non-volatile RAM (NV-RAM), or the like, read only memory (ROM), another type of memory, or a combination thereof. Memory 209 may also comprise static memory containing computer-readable medium (not shown), such as NOR or NAND flash memory in some example embodiments. The instructions, parameters, and profiles 254 of the Wi-Fi switching dongle control system 240 may be stored in memory 209 on a computer-readable medium 252 such as a flash memory or magnetic disk in an example embodiment. More specifically, computer readable medium 252 in an embodiment may store wireless communication profiles for identifying the first wireless speaker and microphone device 280 or the second wireless speaker and microphone device 290 to the audio switching dongle 230 as a device authorized to transceive data with the audio switching dongle 230, as well as information sufficient to identify the first wireless speaker and microphone devices 280 or 290, such as a Media Access Control (MAC) address, IP address. The wireless communication profiles in an embodiment may further store various types of information necessary to perform a handshake between the wireless speaker and microphone devices 280 or 290 and the audio switching dongle 230, such as various public keys, private keys, hashing algorithms, short-term keys, long-term keys, or encryption/decryption algorithms.

Figure 3:
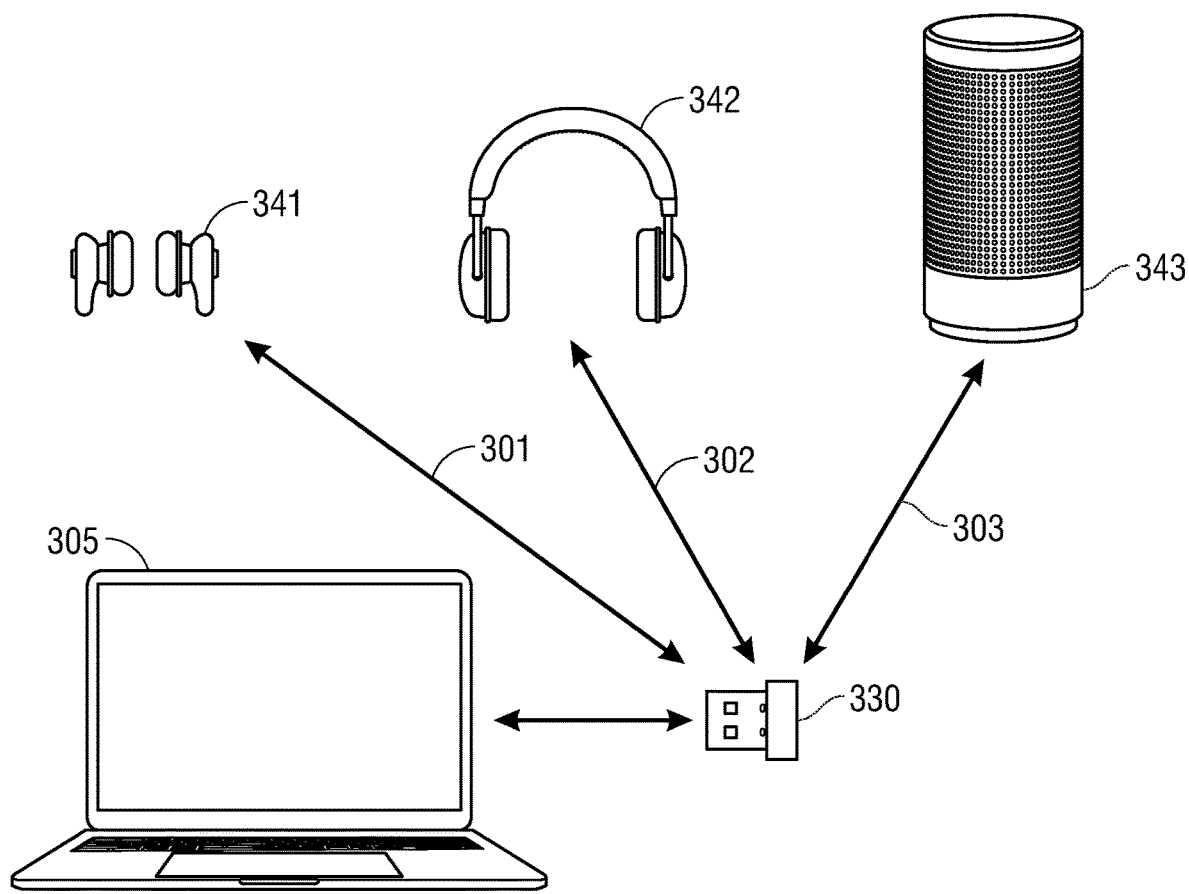
FIG. 3 is a graphical diagram illustrating an audio switching dongle wireless coupling with a plurality of wireless speaker and microphone devices according to an embodiment of the present disclosure.

FIG. 3 is a graphical diagram illustrating an audio switching dongle operatively coupled to the information handling system wirelessly coupled with a plurality of wireless speaker and microphone devices during a pre-setting according to an embodiment of the present disclosure. An audio switching dongle 330 housing a microcontroller executing firmware instructions of the Wi-Fi switching dongle control system in an embodiment may be operatively coupled to an information handling system 305. Such an operative coupling may be performed through insertion of the audio switching dongle 330 within a USB port of the information handling system 305 in an embodiment. In another embodiment, the audio switching dongle 330 may be incorporated within the housing of the information handling system 305 and operatively coupled to the bus of the information handling system 305 through one of several means for transmitting data, including connection through a USB hub, a Thunderbolt hub, or any other type of data transfer hub known in the art.

The audio switching dongle 330 may execute firmware instructions of the Wi-Fi switching dongle control system to wirelessly couple with multiple wireless speaker and microphone devices within communication range of the information handling system 305, such as earbuds 341, headphones 342, and smart speaker 343. In other embodiments, the audio switching dongle may wirelessly couple with other information handling systems (e.g., smart phones, laptops, tablets). This pre-set wireless coupling process in an embodiment may comprise sharing of wireless communication profiles between the audio switching dongle 330 and each of the wireless speaker and microphone devices (e.g., 341, 342, and 343). The audio switching dongle 330 and the each of the wireless speaker and microphone devices (e.g., 341, 342, and 343) in such an embodiment may further perform various types of handshakes using various public keys, private keys, hashing algorithms, short-term keys, or long-term keys as a portion of such a wireless coupling procedure. Any information required to perform such a handshake (e.g., public keys, private keys, hashing algorithms, short-term keys, or long-term keys) as well as information specifically identifying each of the wireless speaker and microphone devices (e.g., 341, 342, or 343) or the information handling system 305 in an embodiment (e.g., MAC addresses for each device) may be stored at both the information handling system 305, the audio switching dongle 330, and each of the wireless speaker and microphone devices (e.g., 341, 342, and 343).

Upon such an initial, pre-set wireless coupling session, the Wi-Fi switching dongle control system operating at the audio switching dongle may establish wireless links with each of the wireless speaker and microphone devices, and transmit a standby command to each of the wireless speaker and microphone devices to initiate a standby or low-power mode. For example, the audio switching dongle 330 may execute firmware instructions of the Wi-Fi switching dongle control system to establish a first wireless link 301 with the first wireless speaker and microphone device 341 (e.g., earbuds), establish a second wireless link 303 with the second wireless speaker and microphone device 343 (e.g., smart speaker), and establish a third wireless link 302 with the third wireless speaker and microphone device 342 (e.g., headphones). Each of the wirelessly coupled wireless speaker and microphone devices (e.g., 341, 342, and 343) in embodiments may remain in such a standby mode, in which their respective radio systems may process only minimal data packets (e.g., control instructions from the audio switching dongle 330, push notifications, e-mails), until the audio switching dongle 330 selects one of the wireless speaker and microphone devices for transmission and receipt of an active audio data stream (e.g., streaming music, podcasts, Wi-Fi or cellular calls, online meetings, etc.), as described in greater detail herein with respect to FIG. 4, below.

Figure 4:
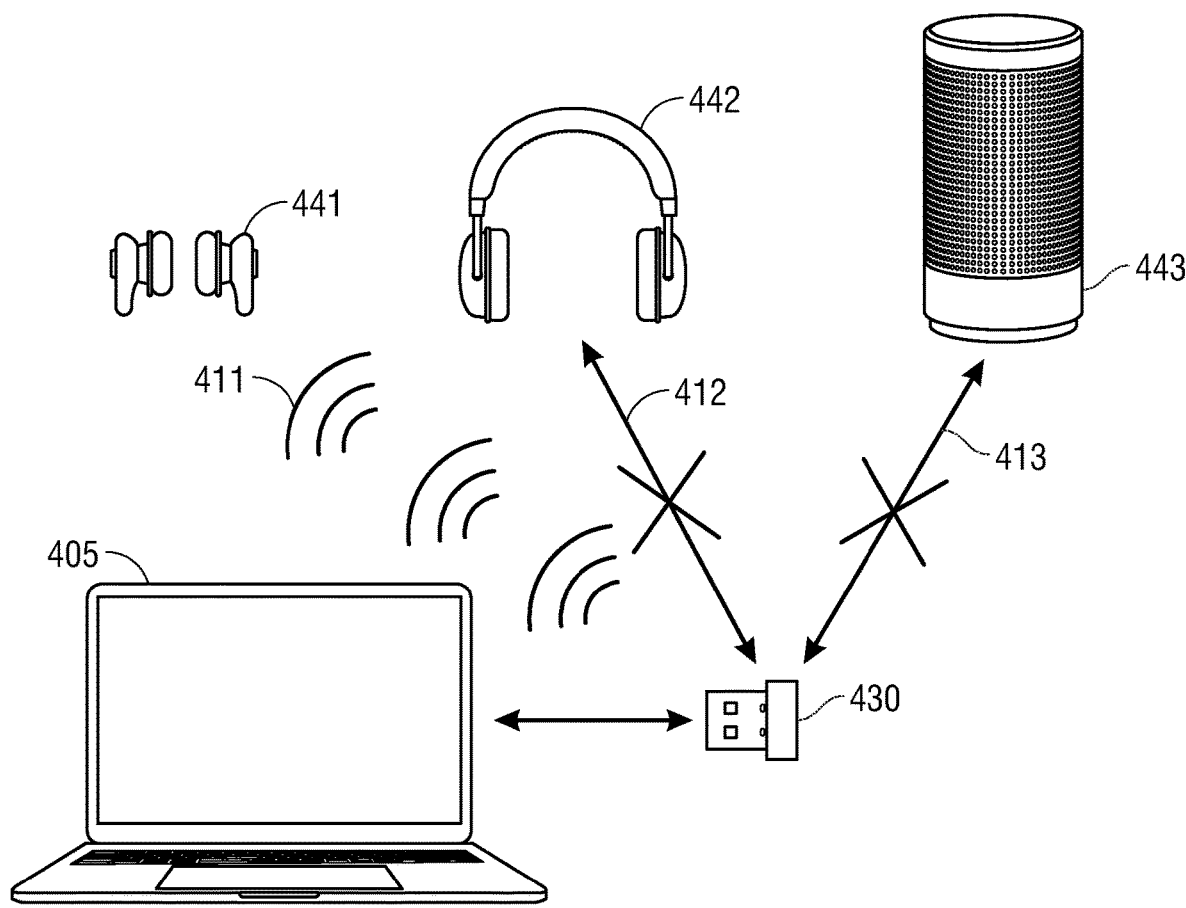
FIG. 4 is a graphical diagram illustrating a wireless speaker and microphone device transceiving audio data on an active audio data stream according to an embodiment of the present disclosure.

FIG. 4 is a graphical diagram illustrating a first wireless speaker and microphone device transceiving audio data pursuant to an active audio data stream according to an embodiment of the present disclosure. The information handling system 405 may initiate an active audio data stream with a remote participant via a network, or locally in an embodiment. For example, the active audio data stream may comprise a phone call established via a cellular network, may comprise an online meeting (e.g., Zoom® meeting or Microsoft® Teams® meeting) established via the worldwide web, or may comprise music streamed from a local or network source.

The information handling system 405 may already be wirelessly coupled with the first wireless speaker and microphone device 441 (e.g., as described above with respect to FIG. 3) via the audio switching dongle 430 and a direct wireless link 411. As described above with reference to FIG. 4, the Wi-Fi switching dongle control system of the audio switching dongle 430 in an embodiment may place each of the wireless speaker and microphone devices (e.g., 441, 442, and 443) in standby mode such that each of their respective wireless speaker and microphone radio systems consume very little power or only transceive a limited type of data packets (e.g., control instructions from the audio switching dongle 430, or push notifications) following the initial wireless coupling of each of these devices (e.g., 441, 442, and 443) with the audio switching dongle 430. While in such a standby mode, none of the wireless speaker and microphone devices 441, 442, or 443 may transceive audio data within an audio data stream until the audio switching dongle 430 selects one in an embodiment.

Upon establishment of the active audio data stream at the information handling system 405 in an embodiment, the audio switching dongle 430, executing firmware instructions of the Wi-Fi switching audio switching dongle control system may select or identify one of the plurality of wirelessly coupled wireless speaker and microphone devices (e.g., 431, 432, or 433) for transmission and receipt of data within the active audio data stream established at the information handling system 405. It may be a default wireless speaker and microphone device or one selected by a user switching input. For example, the audio switching dongle 430 in an embodiment may select the first wireless speaker and microphone device 441 (e.g., earbuds) for output of audio data from the active audio data stream via a speaker, and input audio data to the active audio data stream via a microphone at the first wireless speaker and microphone device 441. In such an embodiment, the audio switching dongle 430 may execute firmware instructions of the Wi-Fi switching dongle control system to transmit a wake or activate command via wireless link 411 to disengage standby mode at the wireless speaker and microphone device 441 (e.g., earbuds). A microcontroller at the wireless speaker and microphone device 441 in an embodiment may execute firmware instructions of the Wi-Fi switching dongle control system counterpart portion at the wireless speaker and microphone device 441 to allow the wireless speaker and microphone radio system at the wireless speaker and microphone device 441 to transceive data without any standby mode-related restrictions. Once the standby mode restrictions have been lifted in an embodiment, the information handling system 405 may transceive audio data on the active audio data stream with the first wireless speaker and microphone device 441 via the first wireless link 411. The remaining wireless speaker and microphone devices (e.g., 442, and 443) may remain in the standby mode initiated by the audio switching dongle 430 (e.g., as described above with respect to FIG. 3), such that their respective wireless links (e.g., 412 and 413) only transceive limited types of data packets (e.g., control instructions from audio switching dongle 430, or push notifications).

Figure 5:
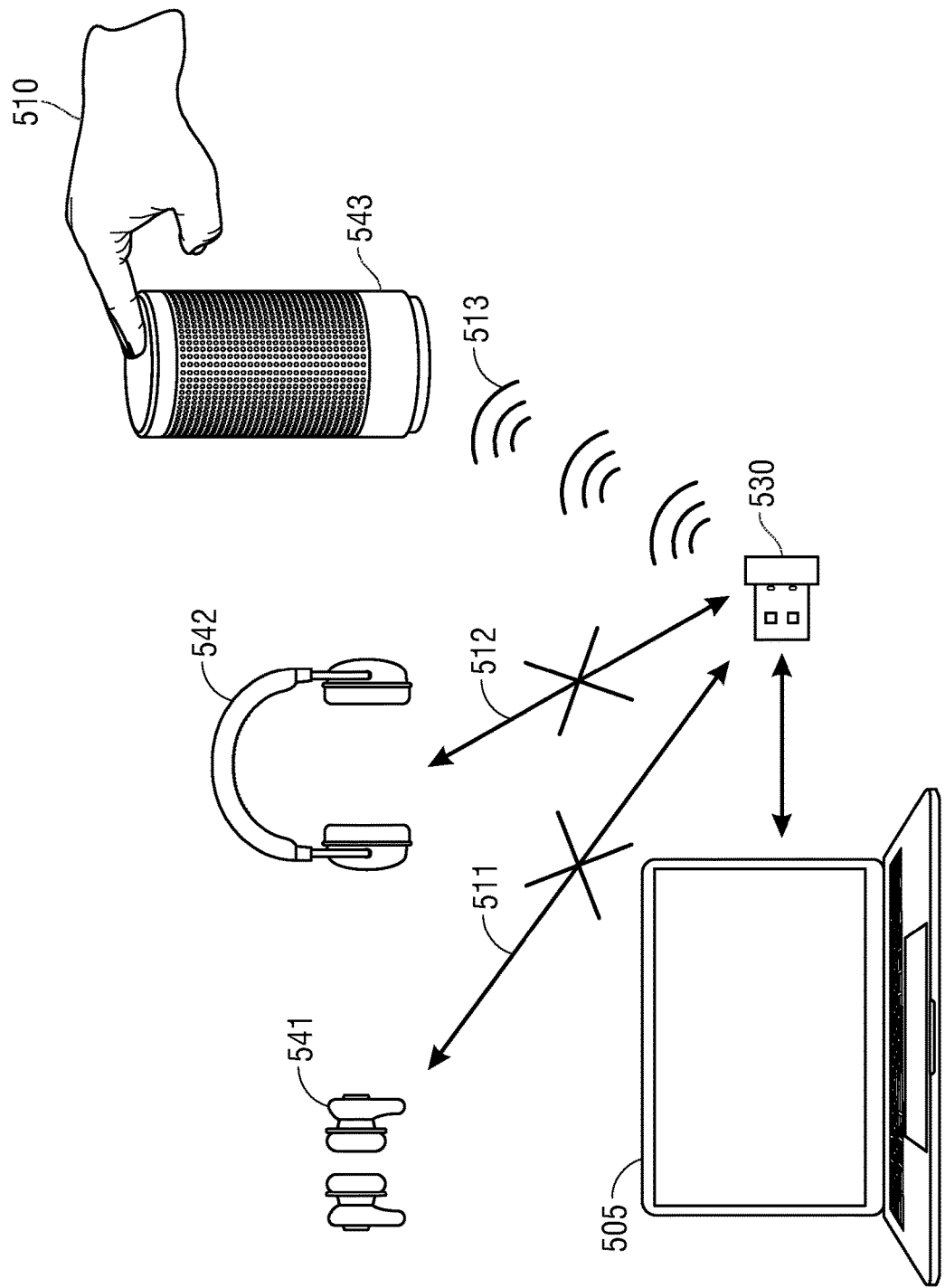
FIG. 5 is a graphical diagram illustrating an active audio data stream handed off to a second wireless speaker and microphone device according to an embodiment of the present disclosure.

FIG. 5 is a graphical diagram illustrating an active audio data stream handed off from a first to a second wireless speaker and microphone device, independently from operation of the information handling system operating system (OS) according to an embodiment of the present disclosure. A user 510 may indicate a desire to switch the active audio stream from the first wireless speaker and microphone device 541 (e.g., earbuds) to a second wireless speaker and microphone device (e.g., smart speaker 543) in embodiments, by providing user input via a user interface (e.g., button, switch, capacitive or resistive touch switch, voice input, etc.) at the second wireless speaker and microphone device 543. In an embodiment, the second wireless speaker and microphone device 543 may transmit a switching command to the audio switching dongle 530 to switch the audio data stream to the second wireless speaker and microphone device 543 via the parallel, second wireless link 513, previously established between the second wireless speaker and microphone device 543 and the audio switching dongle 530. Such a switching command from the second wireless speaker and microphone device 543 (e.g., smart speaker) may be transmitted within data packets, the transmission of which is allowed within the standby mode engaged at the wireless speaker and microphone radio system of the smart speaker 543, in an embodiment.

The Wi-Fi switching dongle control system operating at the audio switching dongle 530 in an embodiment may consequently transmit a first standby command to the first wireless speaker and microphone device 541 (e.g., earbuds) to cease transmission and reception of the active audio data stream by placing its radio system in standby mode. Once in standby mode, the wireless speaker and microphone device radio system at the earbuds 541 may reduce power consumption or limit the type of data packets transceived to specific types (e.g., command instructions to or from the audio switching dongle 530, push notifications, etc.), and may terminate transceiving of audio data on the active audio data stream established at the information handling system 505.

The Wi-Fi switching dongle control system operating at the audio switching dongle 530 in an embodiment may also transmit a wake or activate instruction to the wireless speaker and microphone device 543 (e.g., smart speaker) to disengage standby mode and to begin transmission and reception of audio data on the active audio data stream. As described herein, these instructions to enter and disengage standby mode at the various wireless speaker and microphone devices (e.g., 541, 542, and 543) may be generated, processed, and transmitted via firmware instructions processed by microcontrollers of the audio switching dongle 530 and a counterpart portion executed at the multiple wireless speaker and microphone devices (e.g., 541, 542, and 543), respectively, in an embodiment. As such, selection of and switching between the multiple wireless speaker and microphone devices (e.g., 541, 542, or 543) for receipt and transmission of the active audio data stream, may be performed independently from processing of OS instructions at a processor of the information handling system 505. Thus, the second wireless speaker and microphone device 543 (e.g., smart speaker) may join the active audio data stream (e.g., call, meeting, or session) without requiring the user to instruct the information handling system 505 to handoff the active audio data stream between two separate wireless speaker and microphone devices (e.g., 541 and 543) via a GUI at the information handling system 505. Further, the first wireless speaker and microphone device 541 and the second wireless speaker and microphone device 543 conduct the switching so that both do not transmit and receive on the active audio data stream at the same time. This makes switching seamless and simpler and avoids interruptions or dropped wireless links.

In some embodiments, while the second wireless speaker and microphone device 543 is operating as the primary point of input (e.g., via a microphone) and output (e.g., via a speaker) for the active audio data stream initiated by the information handling system 505, the user may initiate a switch instruction at a third wireless speaker and microphone device 542 (e.g., headphones) indicating a desire to make the third wireless speaker and microphone device 542 the primary source of input (e.g., via a microphone) and output (e.g., via a speaker) for the active audio data stream (e.g., call, meeting, or session) previously established via the information handling system 505. In such an embodiment, the third wireless speaker and microphone device 542 may transmit a switching command to the audio switching dongle 530 to switch the audio data stream to the third wireless speaker and microphone device 542 via the wireless link 512, previously established between the third wireless speaker and microphone device 542 and the audio switching dongle 530. Such a switching command from the wireless speaker and microphone device 542 (e.g., headphones) may be transmitted within data packets, the transmission of which is allowed within the standby mode engaged at the wireless speaker and microphone radio system of the headphones 542, in an embodiment.

The Wi-Fi switching dongle control system operating at the audio switching dongle 530 in an embodiment may consequently transmit a standby command to the second wireless speaker and microphone device 543 (e.g., smart speaker) to cease transmission and reception of the active audio data stream by placing its radio system in standby mode. Once in standby mode, the wireless speaker and microphone device radio system at the smart speaker 543 may reduce power consumption or limit the type of data packets transceived to specific types (e.g., command instructions to or from the audio switching dongle 530, push notifications, etc.), and may terminate transceiving of audio data on the active audio data stream established at the information handling system 505. The Wi-Fi switching dongle control system operating at the audio switching dongle 530 in an embodiment may also transmit a wake or activate command to the wireless speaker and microphone device 542 (e.g., headphones) to disengage standby mode and to begin transmission and reception of the active audio data stream. Thus, the third wireless speaker and microphone device 542 (e.g., headphones) may join the active audio data stream (e.g., call, meeting, or session) without requiring the user to instruct the information handling system 505 to handoff the active audio data stream between two separate wireless speaker and microphone devices (e.g., 543 and 542) via a GUI at the information handling system 505. Further, the second wireless speaker and microphone device 543 and the third wireless speaker and microphone device 542 conduct the switching so that both do not transmit and receive on the active audio data stream at the same time. This makes switching seamless and simpler and avoids interruptions or dropped wireless links. In such a way, the Wi-Fi switching dongle control system operating at the audio switching dongle 530 operatively coupled to the information handling system 505 and at a plurality of wireless speaker and microphone devices (e.g., 541, 542, and 543) in and embodiment may allow a user to seamlessly switch between these wireless speaker and microphone devices (e.g., 541, 542, and 543) as the primary source of input/output during an active audio data stream, without interacting with the OS or a GUI of the information handling system 505.

Figure 6:
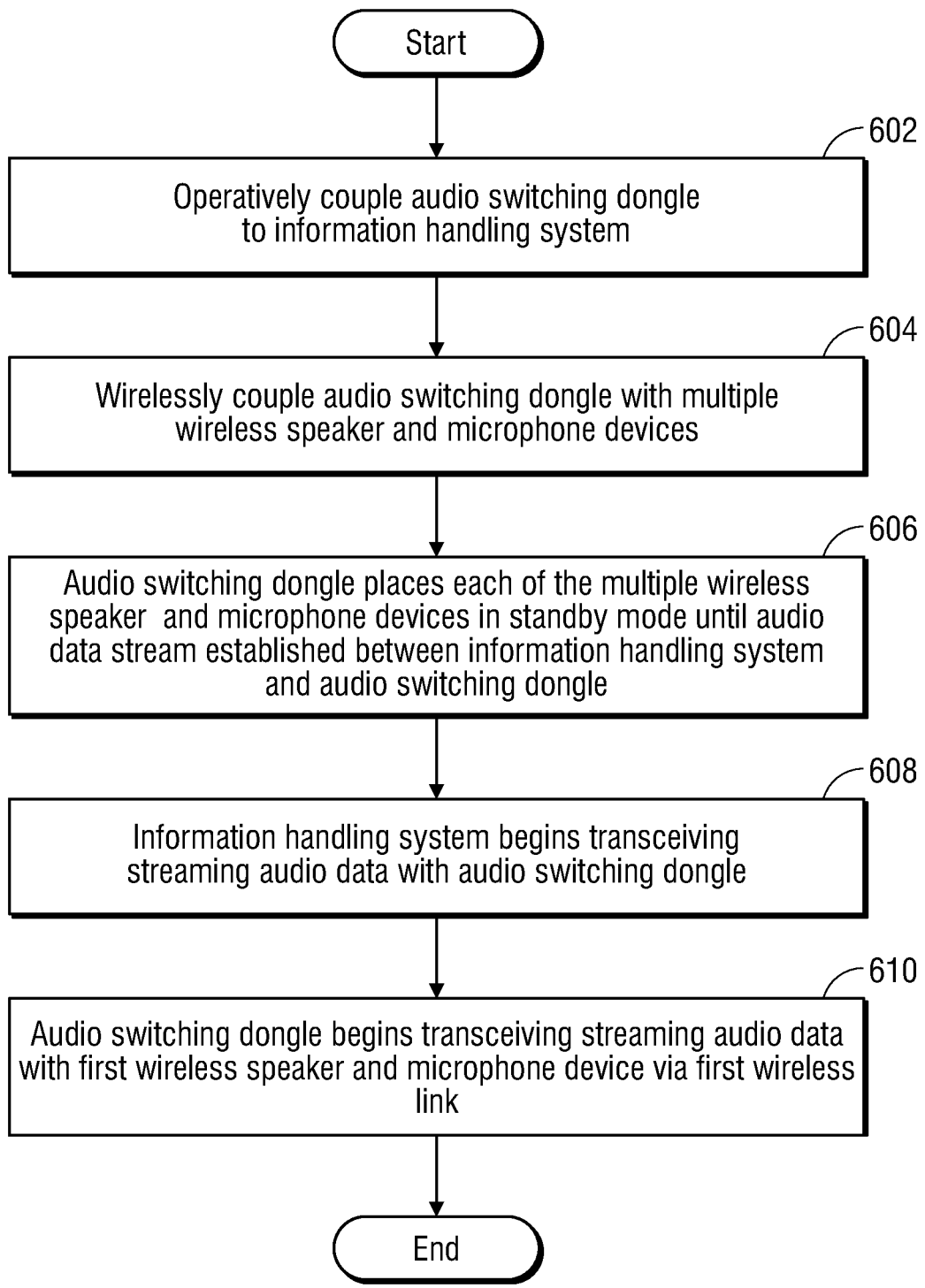
FIG. 6 is a flow diagram illustrating a method of orchestrating transceiving audio data on an active audio data stream among a plurality of pre-set wirelessly coupled wireless speaker and microphone devices according to an embodiment of the present disclosure.

FIG. 6 is a flow diagram illustrating a method of orchestrating transceiving of audio data within an active audio data stream among a plurality of pre-set wirelessly coupled wireless speaker and microphone devices and an information handling system, via an audio switching dongle operatively coupled to the information handling system according to an embodiment of the present disclosure. As described herein, the Wi-Fi switching dongle control system of the audio switching dongle may wirelessly couple with multiple wireless speaker and microphone devices in parallel wireless links within communication range of the information handling system, such as earbuds, headphones, smart speakers, or other information handling systems (e.g., smart phones, laptops, tablets).

At block 602, an audio switching dongle executing firmware code instructions of the Wi-Fi switching dongle control system in an embodiment may be coupled to an information handling system. For example, in an embodiment described with reference to FIG. 3, audio switching dongle 330 may be operatively coupled to information handling system 305 through insertion of the audio switching dongle 330 within a USB port of the information handling system 305 in an embodiment. In another embodiment, the audio switching dongle 330 may be incorporated within the housing of the information handling system 305 and operatively coupled to the bus of the information handling system 305 through one of several means for transmitting data, including connection through a USB hub, a Thunderbolt hub, or any other type of data transfer hub known in the art.

The audio switching dongle may be wirelessly coupled with multiple wireless speaker and microphone devices in an embodiment at block 604. For example, in an embodiment described with reference to FIG. 3, audio switching dongle 330 may execute firmware instructions of the Wi-Fi switching dongle control system to wirelessly couple with multiple wireless speaker and microphone devices within communication range of the information handling system 305 to establish plural, parallel wireless links, such as earbuds 341, headphones 342, and smart speaker 343. This pre-set wireless coupling process in an embodiment may comprise sharing of wireless communication profiles between the audio switching dongle 330 and each of the wireless speaker and microphone devices (e.g., 341, 342, and 343), or performance of various types of handshakes using various public keys, private keys, hashing algorithms, short-term keys, or long-term keys as a portion of such a wireless coupling procedure. This may enable the wireless switching dongle to maintain plural, parallel wireless links with the wireless speaker and microphone devices.

As described in an embodiment with respect to FIG. 1, the audio switching dongle wireless radio system 199 in an embodiment may transmit and receive information necessary to wirelessly couple the wireless speaker and microphone device 180 with the audio switching dongle 130, pursuant to execution by the microcontroller chip 150 of code instructions 154 of the Wi-Fi switching dongle control system 140. A similar pre-setting wireless coupling procedure may be conducted by the audio switching dongle with a second, third or other wireless speaker and microphone device 190. Such information may include, for example, wireless communication profiles for the wireless speaker and microphone devices 180 and 190. Such wireless communication profiles may operate to identify the each of the wireless speaker and microphone devices 180, 190 as a device authorized to transceive data with the information handling system 100 on one of a plurality of parallel wireless links, as well as information sufficient to identify each of the wireless speaker and microphone devices 180 or 190, such as a Media Access Control (MAC) address, IP address. The wireless communication profiles in an embodiment may further store various types of information necessary to perform the handshake between the wireless speaker and microphone devices 180 or 190 and the audio switching dongle 130 operatively coupled to the information handling system 100 described above, such as various public keys, private keys, hashing algorithms, short-term keys, long-term keys, or encryption/decryption algorithms.

As described in an embodiment with respect to FIG. 2, speaker and microphone wireless radio system 299 of the wireless speaker and microphone device 240 in an embodiment may transmit and receive information necessary to wirelessly couple the wireless speaker and microphone device 240 with the audio switching dongle 230 in a first wireless coupling for a first wireless link of plural, parallel wireless links pursuant to execution by the microcontroller chip 250 of code instructions 254 of the Wi-Fi switching dongle control system 240.

At block 606, the audio switching dongle in an embodiment may place each of the wirelessly coupled multiple wireless speaker and microphone devices in standby mode until an audio data stream is established between the information handling system and the audio switching dongle. For example, in an embodiment described with respect to FIG. 3, upon the initial, pre-set wireless coupling session, the Wi-Fi switching dongle control system operating at the audio switching dongle may establish wireless links with each of the wireless speaker and microphone devices, and transmit a standby command to each of the wireless speaker and microphone devices to initiate a standby or low-power mode. For example, the audio switching dongle 330 may execute firmware instructions of the Wi-Fi switching dongle control system to establish a first wireless link 301 with the first wireless speaker and microphone device 341 (e.g., earbuds), establish a second wireless link 303 with the second wireless speaker and microphone device 343 (e.g., smart speaker), and establish a third wireless link 302 with the third wireless speaker and microphone device 342 (e.g., headphones). Each of the wirelessly coupled wireless speaker and microphone devices (e.g., 341, 342, and 343) in embodiments may remain in such a standby mode, in which their respective radio systems may process only minimal data packets (e.g., control instructions from the audio switching dongle 330, push notifications, etc.), until the audio switching dongle 330 selects one of the wireless speaker and microphone devices for transmission and receipt of audio data on an active audio data stream (e.g., streaming music, podcasts, Wi-Fi or cellular calls, online meetings, etc.).

As another example, in an embodiment described with reference to FIG. 2, the microcontroller chip 250 may execute code instructions 254 of the Wi-Fi switching dongle control system 240 to receive a standby command from the audio switching dongle 230, via the speaker and microphone wireless radio system 298, immediately upon initial wireless coupling and establishing a wireless link. The microcontroller chip 250 in an embodiment may execute such a standby command in an embodiment by limiting the power supplied by the PMU 212 to the speaker and microphone wireless radio system 298, or to limit the types of data packets transceived, such as limiting audio data, via the speaker and microphone wireless radio system 298. For example, the microcontroller ship 250 may restrict the speaker and microphone wireless radio system 298 in an embodiment to transceiving of data packets related to command instructions transmitted to or received from the audio switching dongle wireless radio system 299, among other low-bitrate transmissions such as push-notifications. In such a way, the microcontroller chip 250 may place the speaker and microphone wireless radio system 298 in a standby mode where it awaits further instructions from the audio switching dongle 230, without actively transceiving any audio data on the active audio data stream with the audio switching dongle 230. The first wireless speaker and microphone device 280 in such an embodiment may remain in this standby mode until it receives a wake or activate command from the audio switching dongle 230.

The information handling system in an embodiment may begin transceiving streaming audio data on the active audio data stream with the audio switching dongle at block 608. For example, in an embodiment described with reference to FIG. 4, the information handling system 405 may initiate an active audio data stream with a remote participant via a network, or locally, such as a phone call established via a cellular network, an online meeting (e.g., Zoom® meeting or Microsoft® Teams® meeting) established via the worldwide web, or may have music streamed from a local or network source. As another example, in an embodiment described with reference to FIG. 1, the network interface device 160 in an embodiment may establish a wireless link with the network 170 to conduct an active audio data stream from a remote source such as an ongoing call, virtual meeting, or audio streaming from an online audio streaming service. The information handling system 100 in an embodiment may transmit and receive data pursuant to the active audio data stream described directly above with the audio switching dongle 130 via such a bus 108, for example.

At block 610, the audio switching dongle in an embodiment may begin transceiving streaming audio data with the first wireless speaker and microphone device via a first wireless link by transitioning the first wireless speaker and microphone device radio system out of standby mode. For example, in an embodiment described with reference to FIG. 4, upon establishment of the active audio data stream at the information handling system 405 in an embodiment, the audio switching dongle 430, executing firmware instructions of the Wi-Fi switching dongle control system may select or identify one of the plurality of wirelessly coupled wireless speaker and microphone devices (e.g., 431, 432, or 433) for transmission and receipt of data within the active audio data stream established at the information handling system 405. The initial selection may be a default wireless speaker and microphone device, or a wireless speaker and microphone device may be selected by a user pursuant to embodiments herein such as a button, touch sensor switch, switch, software input, audio input command or other. More specifically, the audio switching dongle 430 in an embodiment may select the first wireless speaker and microphone device 441 (e.g., earbuds) for output from audio data of the active audio data stream via a speaker, and input audio data to the active audio data stream via a microphone at the first wireless speaker and microphone device 441.

In such an embodiment, the audio switching dongle 430 may execute firmware instructions of the Wi-Fi switching dongle control system to transmit a wake or activate command via the first wireless link 411 to disengage standby mode at the first wireless speaker and microphone device 441 (e.g., earbuds). A microcontroller at the wireless speaker and microphone device 441 in an embodiment may execute firmware instructions of the Wi-Fi switching dongle control system to allow the wireless speaker and microphone radio system at the first wireless speaker and microphone device 441 to transceive data without any standby mode-related restrictions. Once the standby mode restrictions have been lifted in an embodiment, the information handling system 405 may transceive the active audio data stream with the first wireless speaker and microphone device 441 via the first wireless link 411. The method for orchestrating transceiving of data within an active audio data stream among a plurality of pre-set wirelessly coupled wireless speaker and microphone devices and an information handling system may then end.

Figure 7:
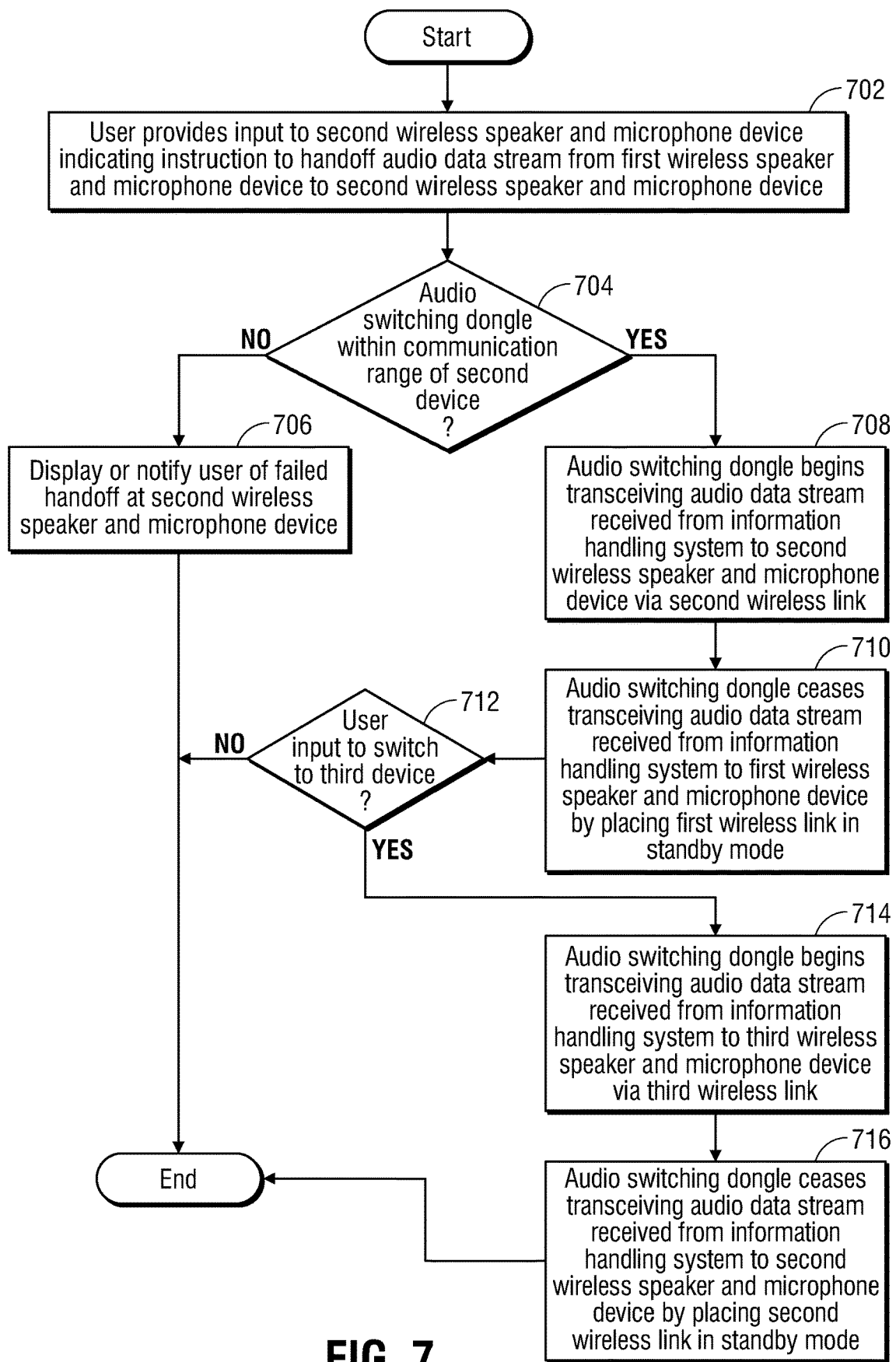
FIG. 7 is a flow diagram illustrating a method of automatically and seamlessly handing off an active audio data stream from a first to a second wireless speaker and microphone device according to an embodiment of the present disclosure.

FIG. 7 is a flow diagram illustrating a method of automatically and seamlessly handing off an active audio data stream with an information handling system from a first wireless speaker and microphone device to a second wireless speaker and microphone device according to an embodiment of the present disclosure. As described herein, the Wi-Fi switching dongle control system operating at an audio switching dongle operatively connected to an information handling system in an embodiment may provide an automatic method for handing off active audio data streams such as calls, meetings, or sessions from one wireless speaker and microphone device to a second wireless speaker and microphone device without the need for user input or use of the operating system (OS) at the information handling system through which the active audio data stream was initiated.

At block 702, the user in an embodiment may provide user switch input to a second wireless speaker and microphone device indicating an instruction to handoff an active audio data stream from a first wireless speaker and microphone device to a second wireless speaker and microphone device. As described in an example embodiment above with respect to FIG. 4, following establishment of a wireless link actively transceiving an audio data stream between the information handling system 405 and a first wireless speaker and microphone device 441 (e.g., earbuds), the remaining wirelessly coupled wireless speaker and microphone devices (e.g., 442, and 443) may remain in the standby mode initiated by the audio switching dongle 430, such that their respective wireless links (e.g., 412 and 413) only transceive limited types of data packets (e.g., control instructions from audio switching dongle 430, push notifications, or e-mails).

In an example embodiment described with reference to FIG. 5, a user 510 may indicate a desire to switch the active audio stream from the first wireless speaker and microphone device 541 (e.g., earbuds) to a second wireless speaker and microphone device (e.g., smart speaker 543) in embodiments, by providing user switch input via a user interface (e.g., button, switch, capacitive or resistive touch switch, voice input, or others) at the second wireless speaker and microphone device 543. In an embodiment, the second wireless speaker and microphone device 543 may transmit a switching command to the audio switching dongle 530 to switch the audio data stream to the second wireless speaker and microphone device 543 via the wireless link 513, previously established between the second wireless speaker and microphone device 543 and the audio switching dongle 530. Such a switching command from the wireless speaker and microphone device 543 (e.g., smart speaker) may be transmitted within data packets, the transmission of which is allowed within the standby mode engaged at the wireless speaker and microphone radio system of the smart speaker 543, in an embodiment.

In another example embodiment described with reference to FIG. 2, the user may indicate, through interaction with an input/output device 220 or the speaker 231 as a user switch input, an intent to switch the active audio data stream to the wireless speaker and microphone device 280. For example, the user may provide such an indication via a push button, a voice assistant, digital display, capacitive or resistive touch switch, or physical switch of an I/O device 220.

At block 704, it may be determined whether the second wireless speaker and microphone device is within communication range of the audio switching dongle and information handling system in an embodiment. For example, in an embodiment described with reference to FIG. 1, the microcontroller chip 150 may execute code instructions 154 of the Wi-Fi switching dongle control system 140 to handoff an active audio data stream from a first wireless speaker and microphone device 180 to a second wireless speaker and microphone device 190 only upon determining that the second wireless speaker and microphone device 190 is within communication range of the audio switching dongle 130. This may be determined passively, because the microcontroller 150 may only execute the instructions 154 in such a way following receipt of a switching command from the second wireless speaker and microphone device 190. If the second wireless speaker and microphone device 190 is not within communication range of the audio switching dongle 130, the audio switching dongle 130 may not receive the switching command. If the audio switching dongle is not within communication range, successful handoff to the second wireless speaker and microphone device may not be possible, and the method may proceed to block 706 for notifying the user of this fact. If the first wireless speaker and microphone device or the information handling system is within communication range, the method may proceed to block 708 for execution of the requested handoff to the second wireless speaker and microphone device.

In an embodiment in which the second wireless speaker and microphone device is not within communication range of the audio switching dongle, an output device at the second wireless speaker and microphone device may display a notification on a screen or via a light or other visual notification or provide an audio feedback such as an error tone of a failed handoff at block 706. For example, in an embodiment described with reference to FIG. 2, an input/output device 220, such as a capacitive or resistive touch-sensitive switch, a push button, a voice assistant, digital display, or physical switch, for example, may also include and provide visible (e.g., light flashing a certain color) or audible feedback (e.g., alarm, buzzer, or voice indicator) to a user that an attempt to handoff the audio data stream to the wireless speaker and microphone device 290 has failed. The method for automatically and seamlessly handing off an active audio data stream with an information handling system from a first wireless speaker and microphone device to a second wireless speaker and microphone device may then end although the system may continue to monitor for another user switch input and the devices within communication range of one another.

At block 708, in an embodiment in which the second wireless speaker and microphone device is within communication range of the audio switching dongle providing an active audio data stream, the audio switching dongle may begin transceiving the active audio data stream received from the information handling system to the second wireless speaker and microphone device via a second wireless link. For example, in an embodiment described with reference to FIG. 5, the Wi-Fi switching dongle control system operating at the audio switching dongle 530 in an embodiment may transmit a wake or activate command to the wireless speaker and microphone device 543 (e.g., smart speaker) to disengage standby mode and to begin transmission and reception of audio data on the active audio data stream. As described herein, these wake/activate and standby commands to enter and disengage standby mode at the various wireless speaker and microphone devices (e.g., 541, 542, and 543) may be generated, processed, and transmitted via firmware instructions processed by microcontrollers of the audio switching dongle 530 and the multiple wireless speaker and microphone devices (e.g., 541, 542, and 543), respectively, in an embodiment. As such, selection of and switching between the multiple wireless speaker and microphone devices (e.g., 541, 542, or 543) for receipt and transmission of the active audio data stream, may be performed independently from processing of OS instructions at a processor of the information handling system 505. Thus, the second wireless speaker and microphone device 543 (e.g., smart speaker) may join the active audio data stream (e.g., call, meeting, or session) without requiring the user to instruct the information handling system 505 to handoff the active audio data stream between two separate wireless speaker and microphone devices (e.g., 541 and 543) via a GUI at the information handling system 505.

At block 710, the audio switching dongle in an embodiment may cease transceiving the audio data stream established by the information handling system to the first wireless speaker and microphone device by placing the first wireless speaker and microphone device in standby mode. For example, in an embodiment described with reference to FIG. 5, the Wi-Fi switching dongle control system operating at the audio switching dongle 530 in an embodiment may transmit a standby command to the first wireless speaker and microphone device 541 (e.g., earbuds) to cease transmission and reception of the active audio data stream by placing its radio system in standby mode. Once in standby mode, the wireless speaker and microphone device radio system at the earbuds 541 may reduce power consumption or limit the type of data packets transceived to specific types (e.g., command instructions to or from the audio switching dongle 530, push notifications, etc.), and may terminate transceiving of data pursuant to the active audio data stream established at the information handling system 505. Thus, the audio switching dongle, first wireless speaker and microphone device 541, and second wireless speaker and microphone device 543 conduct the switching so that both do not transmit and receive on the active audio data stream at the same time. This makes switching seamless and simpler and avoids interruptions or dropped wireless links.

It may be determined at block 712 in an optional embodiment whether a third wireless speaker and microphone device is within range and has received user input indicating a desire to handoff the current active audio data stream to the third wireless speaker and microphone device. For example, as described in an embodiment with respect to FIG. 5, while the second wireless speaker and microphone device 543 (e.g., smart speaker) is operating as the primary point of input (e.g., via a microphone) and output (e.g., via a speaker) for the active audio data stream initiated by the information handling system 505, the user may initiate a switch instruction at a third wireless speaker and microphone device 542 (e.g., headphones). Such a switch instruction may indicate a desire to make the third wireless speaker and microphone device 542 the primary source of input (e.g., via a microphone) and output (e.g., via a speaker) for the active audio data stream (e.g., call, meeting), or session previously established via the information handling system 505. If the user has provided user switch input indicating a desire to handoff the current active audio data stream to a third wireless speaker and microphone device, the method may proceed to block 714. If the user has not provided user switch input indicating a desire to handoff the current active audio data stream to a third wireless speaker and microphone device, the method for automatically and seamlessly handing off an active audio data stream with an information handling system from a first wireless speaker and microphone device to a second wireless speaker and microphone device may then end.

At block 714, the audio switching dongle in an embodiment may begin transceiving audio data on the audio data stream received from the information handling system to a third wireless speaker and microphone device via a third wireless link. For example, in an embodiment described with reference to FIG. 5, the Wi-Fi switching dongle control system operating at the audio switching dongle 530 in an embodiment may transmit a wake or activate command to the wireless speaker and microphone device 542 (e.g., headphones) to disengage standby mode and to begin transmission and reception of the active audio data stream. Thus, the third wireless speaker and microphone device 542 (e.g., headphones) may join the active audio data stream (e.g., call, meeting, or session) without requiring the user to instruct the information handling system 505 to handoff the active audio data stream between two separate wireless speaker and microphone devices (e.g., 543 and 542) via a GUI at the information handling system 505.

At block 716, the audio switching dongle in an embodiment may cease transceiving the audio data stream established by the information handling system to the second wireless speaker and microphone device by transitioning the second wireless link to standby mode. This is done in an embodiment so that the first wireless speaker and microphone device and the second wireless speaker and microphone device do not simultaneously transceive audio data on the active audio data stream with the information handling system. For example, in an embodiment described with reference to FIG. 5, the Wi-Fi switching dongle control system operating at the audio switching dongle 530 may transmit a standby command to the second wireless speaker and microphone device 543 (e.g., smart speaker) to cease transmission and reception of the active audio data stream by placing its radio system in standby mode. Once in standby mode, the wireless speaker and microphone device radio system at the smart speaker 543 may reduce power consumption or limit the type of data packets transceived to specific types (e.g., command instructions to or from the audio switching dongle 530, push notifications, etc.), and may terminate transceiving of audio data on the active audio data stream established at the information handling system 505. The second wireless speaker and microphone device 543 and the third wireless speaker and microphone device 542 conduct the switching so that both do not transmit and receive on the active audio data stream at the same time. This makes switching seamless and simpler and avoids interruptions or dropped wireless links. In such a way, the Wi-Fi switching dongle control system operating at the audio switching dongle 530 operatively coupled to the information handling system 505 and at a plurality of wireless speaker and microphone devices (e.g., 541, 542, and 543) in and embodiment may allow a user to seamlessly switch between these wireless speaker and microphone devices (e.g., 541, 542, and 543) as the primary source of input/output during an active audio data stream, without interacting with the OS or a GUI of the information handling system 505. The method for automatically and seamlessly handing off an active audio data stream with an information handling system from a second wireless speaker and microphone device to a third wireless speaker and microphone device in an embodiment may then end.

The blocks of the flow diagrams of FIGS. 6, and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A first wireless speaker and microphone device wirelessly coupled with an information handling system comprising:
    a microphone and a speaker;
    a wireless speaker and microphone device radio system for operatively coupling via a first Wi-Fi protocol wireless link with an audio switching dongle of the information handling system for wireless audio data stream communications along with a second wireless speaker and microphone device, wherein the first Wi-Fi protocol wireless link is a proprietary Wi-Fi protocol wireless link with metadata and command data exchange capacity between the wireless speaker and microphone device radio system and an audio switching dongle wireless radio system on the audio switching dongle for control of the first wireless speaker and microphone device;
    the wireless speaker and microphone device radio system to transmit and receive audio data on an active audio data stream from a data bus with the audio switching dongle on the information handling system;
    a controller integrated circuit executing code instructions of a Wi-Fi switching dongle control system to receive a switching command pursuant to user switch input received from a user from a second wireless speaker and microphone device via the audio switching dongle of the information handling system; and
    the controller integrated circuit to stop transmission and reception on the active audio transmission and reception by the first wireless speaker and microphone device and place the first Wi-Fi protocol wireless link in standby with the information handling system and to allow the information handling system to communicate the active audio transmission and reception with the second wireless speaker and microphone device via a second, parallel Wi-Fi protocol wireless link for the second wireless speaker and microphone device.

2. The first wireless speaker and microphone device of claim 1, wherein the controller integrated circuit executing code instructions of the Wi-Fi switching dongle control system receiving a standby command from the audio switching dongle to cease transmitting and receiving the audio data via the data bus on the active data stream at the first wireless speaker and microphone device.

3. The first wireless speaker and microphone device of claim 1, wherein a wireless communication profile of the first wireless speaker and microphone device is transmitted and stored in a memory at the audio switching dongle with a second wireless communication profile for the second wireless speaker and microphone device to maintain the Wi-Fi protocol wireless link and a second, parallel Wi-Fi protocol wireless link with the second wireless speaker and microphone device.

4. The first wireless speaker and microphone device of claim 1 further comprising:
    an earbud enclosing the speaker for insertion within an ear canal of a wearer.

5. The first wireless speaker and microphone device of claim 1 further comprising:
    a headphone enclosing the speaker for placement against an ear of a wearer.

6. The first wireless speaker and microphone device of claim 1 further comprising:
    the active audio data stream including a wireless call on the information handling system that is switched between the first wireless speaker and microphone device and the second wireless speaker and microphone device using the Wi-Fi switching dongle control system.

7. The first wireless speaker and microphone device of claim 1, where the audio switching dongle of the information handling system switches to the second, parallel Wi-Fi protocol wireless link for the second wireless speaker and microphone device by selecting the second, parallel Wi-Fi protocol wireless link to transmit and receive the audio data on the active audio data stream from the data bus.

8. The first wireless speaker and microphone device of claim 1 further comprising:
    the controller integrated circuit executing code instructions of the Wi-Fi switching dongle control system to receive a second switching command pursuant to user switch input received from the user from a third wireless speaker and microphone device via the switching dongle of the information handling system; and
    the second switching command from the third wireless speaker and microphone device maintains the status of the first wireless speaker and microphone device and causes the dongle to switch to a third, parallel Wi-Fi protocol wireless links with the third wireless speaker and microphone device to transmit and receive the audio data on the active audio data stream.

9. An information handling system having an audio switching dongle operatively coupled to first wireless speaker and microphone device comprising:
    a processor, memory, power system and data bus;
    the audio switching dongle coupled to the data bus further comprising:
        an audio switching dongle wireless radio system operatively coupled via a first Wi-Fi protocol wireless link to transmit and receive the audio data on an active audio data stream with a first wireless speaker and microphone device;
        the audio switching dongle wireless radio system having a second, parallel Wi-Fi protocol wireless link with a second wireless speaker and microphone device in standby;
        a dongle memory to store a wireless communication profile of the first wireless speaker and microphone device with a second wireless communication profile for the second wireless speaker and microphone device to maintain the first Wi-Fi protocol wireless link and the second, parallel Wi-Fi protocol wireless link;
        the audio switching dongle wireless radio system to receive a switching command from the second wireless speaker and microphone device pursuant to a user switch input from a user;

a controller integrated circuit to activate the second, parallel Wi-Fi protocol wireless link with the second wireless speaker and microphone device to transmit and receive the audio data of the active audio data stream and to transition the first Wi-Fi protocol wireless link to standby in response to receiving the switching command; and the processor to feed and receive the audio data from the audio switching dongle via the data bus.

10. The information handling system wirelessly having an audio switching dongle of claim 9, wherein the Wi-Fi protocol wireless link is a proprietary Wi-Fi protocol wireless link with metadata and command data exchange capacity between the wireless speaker and microphone device radio system and an audio switching dongle wireless radio system on the audio switching dongle for control of the first wireless speaker and microphone device.

11. The first wireless speaker and microphone device of claim 9, where the audio switching dongle of the information handling system switches to the second, parallel Wi-Fi protocol wireless link for the second wireless speaker and microphone device by selecting the second, parallel Wi-Fi protocol wireless links to transmit and receive the audio data on the active audio data stream and sending a standby command to cease transmitting and receiving the audio data on the active data stream to the first wireless speaker and microphone device.

12. The information handling system wirelessly having an audio switching dongle of claim 9 wherein the first wireless speaker and microphone device is a headphone enclosing a speaker for placement against an ear of a wearer.

13. The information handling system wirelessly having an audio switching dongle of claim 9, wherein the audio switching dongle is integrated with a wireless network interface device disposed into the housing of the information handling system.

14. The information handling system wirelessly having an audio switching dongle of claim 9 further comprising:
the active audio data stream including a wireless call on the information handling system that is switched between the first wireless speaker and microphone device and the second wireless speaker and microphone device using the Wi-Fi switching dongle.

15. The information handling system wirelessly having an audio switching dongle of claim 9 further comprising:
the controller integrated circuit to receive a second switching command pursuant to user switch input received from the user from a third wireless speaker and microphone device via the audio switching dongle wireless radio system; and
the second switching command from the third wireless speaker and microphone device to switch, via the controller integrated circuit, the active audio data stream to a third, parallel Wi-Fi protocol wireless link with the third wireless speaker and microphone device and to transition the second, parallel Wi-Fi protocol wireless link with the second wireless speaker and microphone device to standby in response to receiving the second switching command.

16. A method of seamless switching by an audio switching dongle between a first wireless speaker and microphone device and a second wireless speaker and microphone device comprising:

accessing, via the controller integrated circuit, a wireless communication profile of the first wireless speaker and microphone device a second wireless communication profile for the second wireless speaker and microphone device stored in a dongle memory to establish a first Wi-Fi protocol wireless link and a second, parallel Wi-Fi protocol wireless link;

establishing the first Wi-Fi protocol wireless link, via a wireless radio system of the audio switching dongle coupled to a data bus of an information handling system, to transmit and receive the audio data on an active audio data stream with the first wireless speaker and microphone device;

establishing, via the audio switching dongle, the second, parallel Wi-Fi protocol wireless link with the second wireless speaker and microphone device in standby;

receiving a switching command from the second wireless speaker and microphone device pursuant to a user switch input from a user;

activating, via a controller integrated circuit, the second, parallel Wi-Fi protocol wireless link with the second wireless speaker and microphone device to transmit and receive the audio data of the active audio data stream in response to receiving the switching command; and sending a standby command to cease transmitting and receiving the audio data on the active data stream to the first wireless speaker and microphone device in response to receiving the switching command.

17. The method of claim 16, wherein the audio switching dongle is integrated with a wireless network interface device disposed into the housing of the information handling system.

18. The method of claim 16 further comprising:
storing, via the controller integrated circuit, updates to the wireless communication profile of the first wireless speaker and microphone device in the dongle memory with the second wireless communication profile for the second wireless speaker and microphone device to maintain the first Wi-Fi protocol wireless link and the second, parallel Wi-Fi protocol wireless link.

19. The method of claim 16, wherein receiving a switching signal command from the second wireless speaker and microphone device seamlessly switches the active audio data stream to the second wireless speaker and microphone device without interaction with the information handling system or interruption of the active audio transmission and reception with the information handling system.

20. The method of claim 16 further comprising:
receiving a second switching command pursuant to user switch input received from the user from a third wireless speaker and microphone device; and
switching the active audio data stream to a third, parallel Wi-Fi protocol wireless link with the third wireless speaker and microphone device; and
sending a second standby command to cease transmitting and receiving the audio data on the active data stream to the second wireless speaker and microphone device in response to receiving the second switching command.

* * * * *